US012639610B2

(12) United States Patent
Herbert

(10) Patent No.: US 12,639,610 B2
(45) Date of Patent: May 26, 2026

(54) QUANTUM-CLASSICAL HYBRID COMPUTER FOR CALCULATING ARITHMETIC FUNCTIONS USING FOURIER ANALYSIS

(71) Applicant: Quantinuum Ltd, London (GB)

(72) Inventor: Steven Herbert, Cambridge (GB)

(73) Assignee: Quantinuum Ltd, London (GB)

( * ) Notice: Subject to any disclaimer, the term of this patent is extended or adjusted under 35 U.S.C. 154(b) by 1059 days.

(21) Appl. No.: 17/684,254

(22) Filed: Mar. 1, 2022

(65) Prior Publication Data

US 2023/0036827 A1 Feb. 2, 2023

(30) Foreign Application Priority Data

| Mar. 2, 2021 | (GB) | ................................. | 2102902 |
| Mar. 2, 2021 | (SE) | ................................. | 2130060-3 |
| Jul. 16, 2021 | (GB) | ................................. | 2110299 |

(51) Int. Cl.
*G06N 10/60* (2022.01)
*G06N 10/40* (2022.01)

(52) U.S. Cl.
CPC ............. *G06N 10/60* (2022.01); *G06N 10/40* (2022.01)

(58) Field of Classification Search
None
See application file for complete search history.

(56) References Cited

U.S. PATENT DOCUMENTS

| 11,537,870 | B1 * | 12/2022 | Teig | ........................ | H04L 1/24 |
| 2016/0328253 | A1 * | 11/2016 | Majumdar | ............. | G06N 10/80 |

| 2018/0040032 | A1 * | 2/2018 | Chalasani | ......... | G06Q 30/0277 |
| 2019/0220497 | A1 * | 7/2019 | Wiebe | .................... | G06N 10/60 |
| 2019/0236627 | A1 * | 8/2019 | Christensen | ............. | G06N 7/01 |

(Continued)

FOREIGN PATENT DOCUMENTS

| WO | WO 15/188025 | 12/2015 |
| WO | WO 18/086761 | 5/2018 |

OTHER PUBLICATIONS

Aaronson et al., Jan. 2020, Quantum approximate counting, simplified, Symposium on Simplicity in Algorithms, pp. 24-32, http://dx.doi.org/10.1137/1.9781611976014.5.

(Continued)

*Primary Examiner* — Ryan C Vaughn
(74) *Attorney, Agent, or Firm* — KNOBBE, MARTENS, OLSON & BEAR, LLP

(57) ABSTRACT

A quantum computing system includes a classical computer coupled in combination with a quantum computer, wherein the quantum computing system is configurable to execute program instructions to process input data to generate corresponding output data. The program instructions include one or more arithmetic functions to be executed using the quantum computer. The quantum computing system is configured to apply a transformation to transform the one or more arithmetic functions into a series of Fourier components that are executable using the quantum computer by using one or more quantum circuits utilizing rotation gates acting on qubits representing the Fourier components, and to process outputs from the one or more quantum circuits to generate results of the one or more arithmetic functions, wherein the results are used to generate the corresponding output data.

20 Claims, 13 Drawing Sheets

(56) References Cited

U.S. PATENT DOCUMENTS

| | | | |
|---|---|---|---|
| 2020/0167278 A1* | 5/2020 | Gunnels | G06F 12/0215 |
| 2020/0349457 A1 | 11/2020 | Low et al. | |
| 2021/0279625 A1* | 9/2021 | Shani | G06F 15/16 |
| 2021/0287126 A1 | 9/2021 | Prakash et al. | |
| 2022/0014364 A1* | 1/2022 | McCarty | H04B 10/70 |
| 2022/0107989 A1* | 4/2022 | Kachman | G06N 10/60 |
| 2022/0222412 A1* | 7/2022 | Huffman | G06F 30/31 |

OTHER PUBLICATIONS

Bennett et al., 2020. Quantum cryptography: Public key distribution and coin tossing, Theoretical Computer Science, 560:7-11.

Brassard et al., Mar. 2, 2000, Quantum amplitude amplification and estimation, arXiv:quanti-ph/0005055v1, 32 pp.

Chakrabarti et al., Dec. 16, 2020, A threshold for quantum advantage in derivative pricing, arXiv:2012.03819v2 [quant-ph], 36 pp.

Egger et al., Jul. 5, 2019, Credit risk analysis using quantum computers, arXiv:1907.03044v1 [quant-ph], 8 pp.

Grinko et al., Dec. 11, 2019, Iterative quantum amplitude estimation, arXiv:1912.05559v1 [quant-ph], 10 pp.

Grover Aug. 15, 2002, Creating superpositions that correspond to efficiently integrable probability distributions, arXiv:quant-ph/0208112v1, 2 pp.

Herbert, Dec. 10, 2021, Quantum Monte-Carlo integration: the full advantage in minimal circuit depth, ariv:2105.09100v3 [quant-ph], 17 pp.

Herbert, May 18, 2021, The problem with grover-rudolph state preparation for quantum monte-carlo integration, arxiv:2101.02240v2 [quant-ph], 7 pp.

Koch et al., Aug. 24, 2020, Fundamentals In Quantum Algorithms: A Tutorial Series Using Qiskit Continued, arxiv.org, Cornell University Library, 170 pp.

Koch et al., Jan. 21, 2021, Gate-Based Circuit Designs for Quantum Adder Inspired Quantum Random Walks on Superconducting Qubits, arXiv:2012.10268v2 [quant-ph] 15 pp.

Lloyd et al., Jul. 2018, Quantum generative adversarial learning, Physical Review Letters, 121(4):040502, 5 pp.

Nakaji, Mar. 5, 2020, Faster amplitude estimation, arXiv:2003.02417v1 [quant-ph], 10 pp.

Nielsen et al., 2000, Quantum Computation and Quantum Information, Cambridge University Press, Cambridge, UK, pp. 608-609.

Orus et al., 2019, Quantum computing for finance: Overview and prospects, Review in Physics, 4:100028, 12 pp.

Pogorelov et al., Jun. 7, 2021, A compact ion-trap quantum computing demonstrator, arXiv:2101.11390v3 [quant-ph], 22 pp.

Rebentrost et al., Nov. 9, 2018, Quantum computational finance: quantum algorithm for portfolio optimization, arXiv:1811.03975v1 [quant-ph].

Scherer et al., Jan. 25, 2017, Concrete resource analysis of the quantum linear-system algorithm used to compute the electromagnetic scattering cross section of a 2D target, Quantum Information Processing, 16(3):1-65.

Stamatopoulos et al., Jul. 2020, Option pricing using quantum computers, Quantum, 4:291.

Suzuki et al., Jan. 2020, Amplitude estimation without phase estimation, Quantum Information Processing, 19:75http://dx.doi.org/10.1007/s11128-019-2565-2, 17 pp.

Suzuki et al., Jan. 2020, Amplitude estimation without phase estimation, arXiv:1904.10246v2 [quant-ph], 13 pp.

Van den Berg et al., 2020, Circuit optimization of Hamiltonian simulation by simultaneous diagonalization of Pauli clusters, arXiv:2003.13599v2 [quant-ph], 28 pp.

Vazquez et al., 2021, Efficient state preparation for quantum amplitude estimation. Physical Review Applied, 15(3), 034027.

Vazquez et al., May 15, 2020, Efficient state preparation for quantum amplitude estimation, arXiv:2005.0771v1 [quant-ph], 12 pp.

Woerner et al., Feb. 2019, Quantum risk analysis, NPJ/Quantum Information, 5(15), 8 pp.

Zhou et al., Feb. 10, 2017, Quantum Fourier transform in computational basis, Quantum Information Processing, 16(3):1-19.

Zoufal et al., Nov. 2019, Quantum generative adversarial networks for learning and loading random distributions, npj Quantum Information, 5:103, 9 pp.

European Search Report for Appl. No. EP 22159844, Sep. 8, 2022, 10 pp.

Nagy et al., 2006, Quantum computation and quantum information, International Journal of Parallel, Emergent and Distributed Systems, 21:1, 1-59.

* cited by examiner

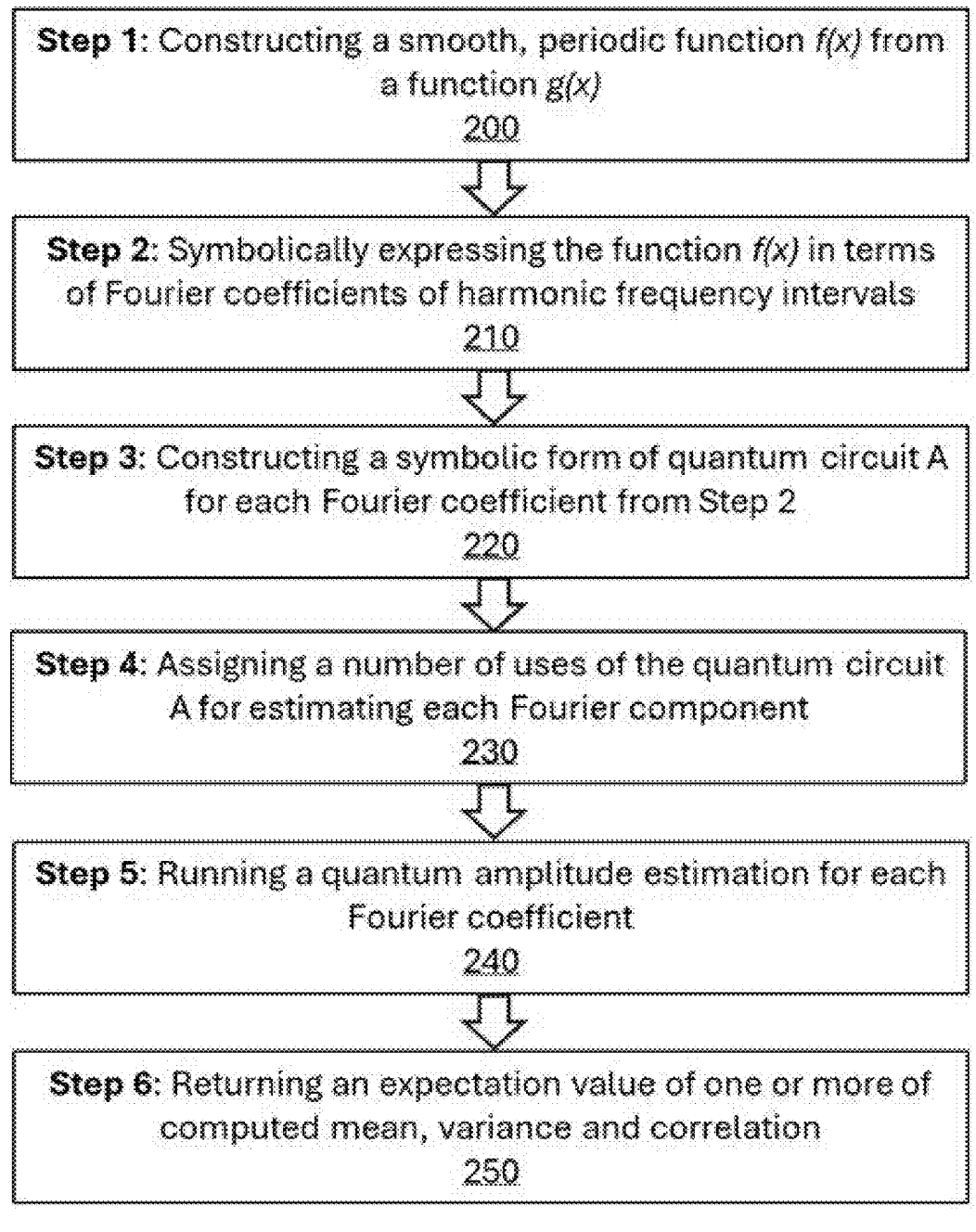

Step 1: Constructing a smooth, periodic function *f(x)* from a function *g(x)*
200

Step 2: Symbolically expressing the function *f(x)* in terms of Fourier coefficients of harmonic frequency intervals
210

Step 3: Constructing a symbolic form of quantum circuit A for each Fourier coefficient from Step 2
220

Step 4: Assigning a number of uses of the quantum circuit A for estimating each Fourier component
230

Step 5: Running a quantum amplitude estimation for each Fourier coefficient
240

Step 6: Returning an expectation value of one or more of computed mean, variance and correlation
250

FIG. 3

Flowchart of the algorithm

700

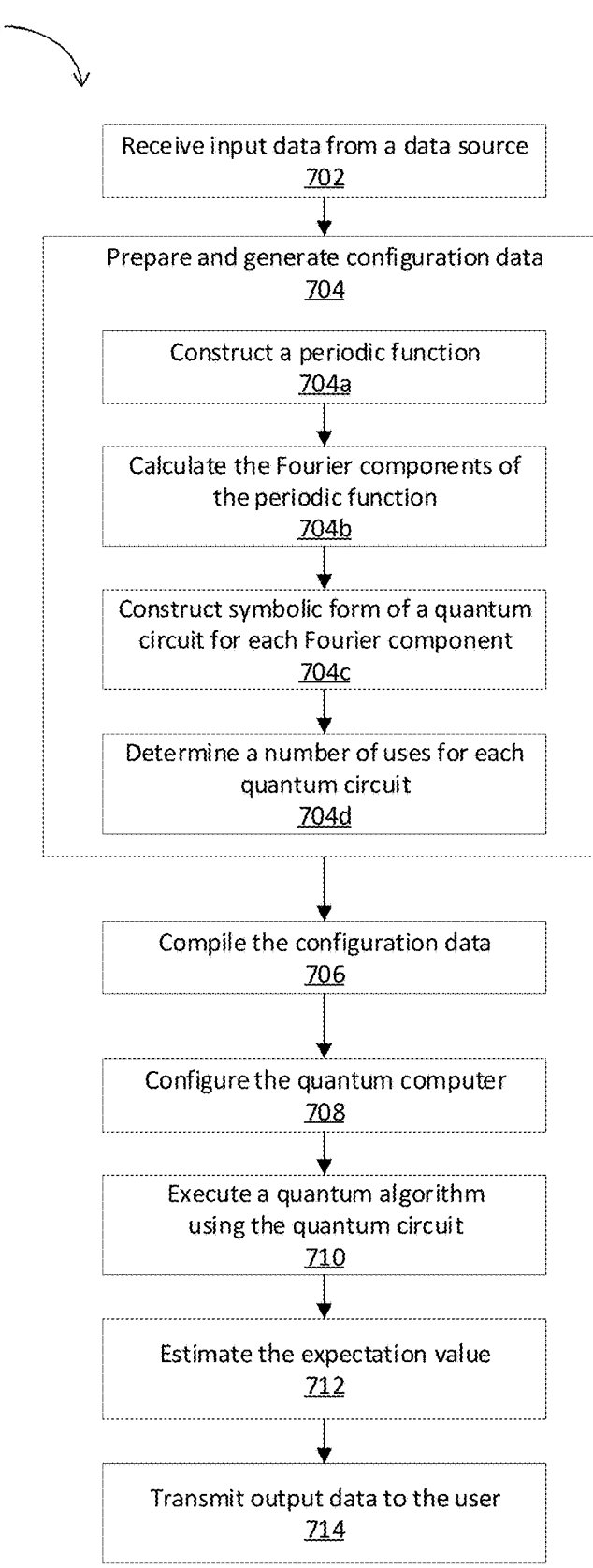

Receive input data from a data source
702

Prepare and generate configuration data
704

Construct a periodic function
704a

Calculate the Fourier components of
the periodic function
704b

Construct symbolic form of a quantum
circuit for each Fourier component
704c

Determine a number of uses for each
quantum circuit
704d

Compile the configuration data
706

Configure the quantum computer
708

Execute a quantum algorithm
using the quantum circuit
710

Estimate the expectation value
712

Transmit output data to the user
714

FIG. 7

Distributed quantum computing system
1000

QUANTUM-CLASSICAL HYBRID COMPUTER FOR CALCULATING ARITHMETIC FUNCTIONS USING FOURIER ANALYSIS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present disclosure relates to quantum computing systems for performing computations. Moreover, the present disclosure relates to methods for using aforesaid quantum computing systems. Furthermore, the present disclosure relates to software products, for example stored in a data carrier, wherein the software products are executable on quantum computing hardware to implement aforesaid methods.

Description of the Related Art

Contemporary computing hardware, for example configured to use Silicon-based integrated circuits and associated data memory devices for performing data processing, becomes more computationally powerful and faster as feature sizes of its integrated circuits become smaller. As circuit feature sizes approach nanometre-scale, Heisenberg's uncertainty principle and quantum effects become more significant in circuit design and operation. In the limit, using single particles, for example ions or photons, to represent data, namely in a form of qubits, represents a limit of miniaturization and provides a fastest computing performance, especially when phenomena such as superposition and entanglement are used; such an approach is used in contemporary quantum computers. Quantum computers exploit the quantum nature of fields and particles to increase the computation speed compared to classic computers and enable solving computationally complex problems within timeframes suitable for practical applications.

SUMMARY

The present disclosure seeks to provide an improved quantum computing system that is configured to be able to process data in a more effective manner, for example in a situation where the processing involves computing arithmetic functions, for example one or more of:

(i) Functions of single variables, for example a mean (namely, a numerical or numeral average) of a variable, or a variance of a variable; and (ii) Functions of multiple variables, for example covariances between a plurality of variables, or correlations between a plurality of variables.

A variable may be a random variable having values sampled from a probability distribution, a function of the probability distribution, or a portion of the probability distribution. The probability distribution can be multivariate probability distribution.

Moreover, the present disclosure seeks to provide an improved method for configuring a quantum computing system to process data in a more effective manner, for example, where the processing involves computing one or more of: aforesaid functions of single variables, aforesaid functions of multiple variables. The improved method may facilitate implementation of certain quantum algorithms (e.g., by reducing circuit depth), reduce or eliminate quantum arithmetic, reduce transferring tasks between a classic and a quantum computer within the computing system. Advantageously, the disclosed methods and systems, may provide the aforesaid improvements without significant impact on the computation time and/or accuracy. In some cases, the disclosed methods may allow computation of the expectation value of an arithmetic function applied on samples selected from a probability distribution without the need for performing quantum arithmetic while allowing a mean square (MSE) convergence rate larger than a MSE convergence rate allowed by other (e.g., conventional) methods implemented on classical and/or quantum computers.

According to a first aspect, there is provided a quantum computing system including a classical computer coupled in combination with a quantum computer, wherein the quantum computing system is configurable to execute program instructions to process input data ($D_{in}$) to generate corresponding output data ($D_{out}$), wherein the program instructions include one or more arithmetic functions to be executed using the quantum computer, wherein the quantum computing system (e.g., the classical computer of the quantum computing system) is configured to apply a transformation to transform the one or more arithmetic functions into a series of Fourier components that are executable using the quantum computer (also referred to as executable Fourier components) by using one or more quantum circuits utilizing rotation gates acting on qubits representing the Fourier components, and to process outputs from the one or more quantum circuits to generate results of the one or more arithmetic functions, wherein the results are used to generate the corresponding output data ($D_{out}$).

In some cases, the classical computer is in communication with the quantum computer, and executes program instructions that are stored in a non-transitory memory of the quantum computing system. In some cases, the non-transitory memory can be a memory of the classical computer.

In some cases, the input data ($D_{in}$) comprises one or more arithmetic functions to be computed using the quantum computer. In some such cases, the quantum computing system (e.g., the classical computer of the quantum computing system) executes the program instructions using the processor to: apply a transformation to transform the one or more arithmetic functions into a series of executable Fourier components that are executable using the quantum computer by using one or more quantum circuits utilizing rotation gates acting on qubits representing the executable Fourier components, and to process outputs from the one or more quantum circuits to generate results of the one or more arithmetic functions, wherein the results are used to generate the corresponding output data ($D_{out}$).

In some cases, an executable Fourier component may comprise one or more quantum circuits configured to generate results usable for computing or estimating a value of the Fourier component. In some cases, an executable Fourier component may comprise a symbolic form of the quantum circuit that can be used to construct one or more quantum circuits configured to generate results usable for computing or estimating a value of the Fourier component. In various implementations, the one or more quantum circuits may generate results by acting on quantum states. In some cases, the quantum states can be associated with a probability distribution. In some examples, the computed or estimated value of the Fourier component is associated with the probability distribution.

The classic computer (also referred to as a classical computer) can be a binary data computer implemented based on conventional electronic circuits (e.g., Silicon integrated circuits).

The results may include or be associated with means of variables, variances of variables (e.g., random variables). Yet more optionally, the quantum computing system is configured so that the means or variances of random variables include a given function applied to random samples from a marginal data distribution corresponding to one dimension of a multivariate probability distribution.

The invention is of advantage in that configuring the quantum computing system to represent arithmetic functions by corresponding Fourier components that are efficiently processed on the quantum computer by using rotation operations enables the quantum computing system to exhibit an enhanced performance when processing data involving arithmetic functions to be executed on the data. For example, computing the arithmetic function using the corresponding Fourier components may reduce a number of quantum queries required to compute the arithmetic function with an error (e.g., mean-square-error), below a threshold value. Moreover, decomposing the arithmetic function to Fourier components may reduce or eliminate the need for quantum arithmetic.

Optionally, the quantum computing system is configured so that the transform includes a truncating arrangement to restrict a total number of the Fourier components or a total number of the executable Fourier components. In some examples, the total number of the Fourier components can be restricted by a threshold value of the error incurred by the truncation. In some cases, the truncating arrangement may comprise methods for determining the total number of Fourier components based at least in part a desired value of an error (e.g., a mean square error) and/or a number of uses assigned to a quantum circuit representing a Fourier component.

Optionally, the quantum computing system is configured to use the series of Fourier components executable on the quantum computer to compute one or more of: functions of a single variable, functions of multiple variables. These functions maybe computed using values of one or more random variable sampled from a probability distribution (e.g., a multidimensional discrete probability distribution). More optionally, the quantum computing system is configured to use the series of Fourier components executable on the quantum computer to compute the functions of single variables including one or more of: means of variables, variances of variables. Yet more optionally, the quantum computing system is configured so that the means or variances of random variables include a given function applied to random samples from a marginal data distribution corresponding to one dimension of a multivariate probability distribution.

Optionally, the quantum computing system is configured, wherein the functions of multiple variables include one or more of: covariances of sets of variables, correlations of sets of variables.

Optionally, the quantum computing system is configured to:

(i) construct a smooth, periodic function $f(x)$ from a function $g(x)$, wherein $g(x)$ is a continuous function that has a continuous first derivative supporting over a probability function $p(x^{(i)})$, wherein p is a discrete probability distribution to be processed; wherein, when there is a plurality of the periodic function $f(x)$, namely $f_1(x)$, $f_2(x)$ . . . , the plurality applies to mutually different dimensions of a multivariate probability density function (PDF);

(ii) symbolically express the function $f(x)$ in terms of Fourier coefficients in respect of harmonic frequency intervals; wherein, when there is a plurality of the function $f(x)$, such expressing in terms of Fourier coefficients is used for each of the plurality of the function $f(x)$;

(iii) construct a symbolic form of a quantum circuit A for each Fourier coefficient in (ii);

(iv) assign a number of uses of a quantum circuit A for estimating each Fourier component;

(v) run a quantum amplitude estimation (QAE) for each Fourier coefficient; and (vi) return an expectation value of one or more of computed mean, variance and correlation from (v).

More optionally, when configuring the quantum computing system, the function $f(x)$ is an even, smooth, periodic function. Alternatively, more optionally, when configuring the quantum computing system, the function $f(x)$ is an odd, smooth, periodic function.

In some cases, the quantum circuit A comprises an executable Fourier component of the executable Fourier components.

In some cases, at step (iv), the quantum computing system may assign a number of uses of a quantum circuit A for estimating a Fourier component of the function $f(x)$ associated with each executable Fourier component;

In some cases, at step (iii), the quantum computing system may first construct a symbolic form of A and then for each Fourier component calculate a specific numerical value associated with A.

In some cases, the function $g(x)$ can be the arithmetic function that is computed based on values of one or more random variables samples from a probability distribution. In some cases, symbolically expressing the function $f(x)$ in terms of Fourier coefficients may comprise, representing or approximating the function $f(x)$ by a sum of trigonometric functions, or decomposing the function $f(x)$ to its Fourier components.

In some examples, the quantum circuit A comprises an executable Fourier component of the executable Fourier components calculated for the arithmetic function (e.g., the function $g(x)$);

More optionally, the quantum computer is configured to implement (iv) and (v) in an iterative manner until a stop criterion is satisfied.

Optionally, the quantum computing system (e.g., the classical computer in the quantum computing system) is configured to host a mathematical model of a given system, wherein the quantum computing system is configured to use the input data ($D_{in}$) to provide input vectors (SV1) to the mathematic model, and to use output vectors (SV2) from the mathematic model to generate at least one of analyses, control signals, instructions for interacting with the given system.

According to a second aspect, there is provided a method for (namely, a method of) using a quantum computing system including a classical computer coupled in combination with a quantum computer, wherein the quantum computing system is configurable to execute program instructions to process input data ($D_{in}$) to generate corresponding output data ($D_{out}$), wherein the method includes:

(i) providing program instructions include one or more arithmetic functions to be executed using the quantum computer, (ii) configuring the quantum computing system to apply a transformation to transform the one or more arithmetic functions into a series of Fourier components that are executable using the quantum computer by using one or more quantum circuits utilizing rotation gates acting on qubits representing the Fourier components; and (iii) processing outputs from the one or more quantum circuits to generate results of the one or more arithmetic functions, and then using the results to generate the corresponding output data ($D_{out}$).

In some embodiments, the one or more arithmetic functions may be included in the input data and step (i) may include providing input data ($D_{in}$).

In some cases, execution of arithmetic functions may comprise computing the values of the one or more arithmetic functions applied on samples from a probability distribution.

Optionally, the method includes arranging for the transform to include a truncating arrangement to restrict a total number of the Fourier components.

Optionally, the method includes configuring the quantum computing system to use the series of Fourier components executable (also referred to as executable Fourier components) on the quantum computer to compute one or more of: functions of a single variable, functions of multiple variables. More optionally, in the method, the functions of single variables include one or more of: means of variables, variances of variables. Alternatively, more optionally, in the method, the functions of multiple variables include one or more of: covariances of sets of variables, correlations of sets of variables.

Optionally, the method includes using the quantum computing system:

(i) to construct a smooth, periodic function $f(x)$ from a function $g(x)$, wherein $g(x)$ is a continuous function that has a continuous first derivative supporting over a probability function $p(x^{(i)})$, wherein p is a discrete probability distribution to be processed; wherein, when there is a plurality of the periodic function $f(x)$, namely $f_1(x)$, $f_2(x)$ . . . , the plurality applies to mutually different dimensions of a multivariate probability density function (PDF);

In some examples, the one or more arithmetic functions comprise the function g(x), (ii) to symbolically express the function $f(x)$ in terms of Fourier coefficients in respect of harmonic frequency intervals; wherein, when there is a plurality of the function $f(x)$, such expressing in terms of Fourier coefficients is used for each of the plurality of the function $f(x)$;

(iii) to construct a symbolic form of a quantum circuit A for each Fourier coefficient in (ii);

(iv) to assign a number of uses of a quantum circuit A for estimating each Fourier component;

(v) to run a quantum amplitude estimation (QAE) for each Fourier coefficient; and (vi) to return an expectation value of one or more of computed mean, variance and correlation from (v).

In some cases, the expectation value of one or more of computed mean may comprise the mean of a probability distribution implicitly defined by an arithmetic function (e.g., the function g(x) applied to samples from the probability distribution).

In some cases, A may comprise an executable Fourier component of the executable Fourier components.

In some cases, step (iv) of the method may comprise, using the quantum computing system to assign a number of uses of a quantum circuit A for estimating a Fourier component of the function $f(x)$ associated with each executable Fourier component.

Optionally, the method includes configuring the quantum computing system, wherein the function $f(x)$ is an even, smooth, periodic function. Alternatively, optionally, the method includes configuring the quantum computing system, wherein the function $f(x)$ is an odd, smooth, periodic function.

Optionally, the method includes configuring the quantum computer to implement (iv) and (v) in an iterative manner until a stop criterion is satisfied.

Optionally, the method includes configuring the quantum computing system to host a mathematical model of a given system, wherein the quantum computing system is configured to use the input data ($D_{in}$) to provide input vectors (SV1) to the mathematic model, and to use output vectors (SV2) from the mathematic model to generate at least one of analyses, control signals, instructions for interacting with the given system.

In some cases, the method includes generating the input vectors (SV1) by at least computing an expectation value of one or more of mean (e.g., a mean of a probability distribution), variance and correlation using the steps described above.

According to a third aspect, there is provided a software product recorded on a computer-executable data storage medium, wherein the software product is executable on data processing hardware for implementing a method of the second aspect.

In some cases, the quantum computing system may include at least one electronic processor and a non-transitory memory configured to store data and specific computer-executable instructions. The electronic processor may be in communication with the memory and may be configured to specific computer-executable instructions to at least perform one or more steps of the processes described above with respect to constructing a smooth periodic function from an arithmetic function (e.g., stored in the memory or received from a user interface, transforming the arithmetic function and/or the periodic function into a series of Fourier components, constructing a symbolic form of a quantum circuit for each Fourier component, assigning a number of uses of the quantum circuit associated with each Fourier component.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

Embodiments of the present disclosure will now be described, by way of example only, with reference to diagrams of the present disclosure, wherein:

FIG. 3 is a flow diagram of steps of a method of configuring a quantum computing system of the present disclosure.

FIG. 7 is a flow diagram illustrating an example method that may be used by quantum computing system to determine the expectation value of an arithmetic function.

Figure 1:
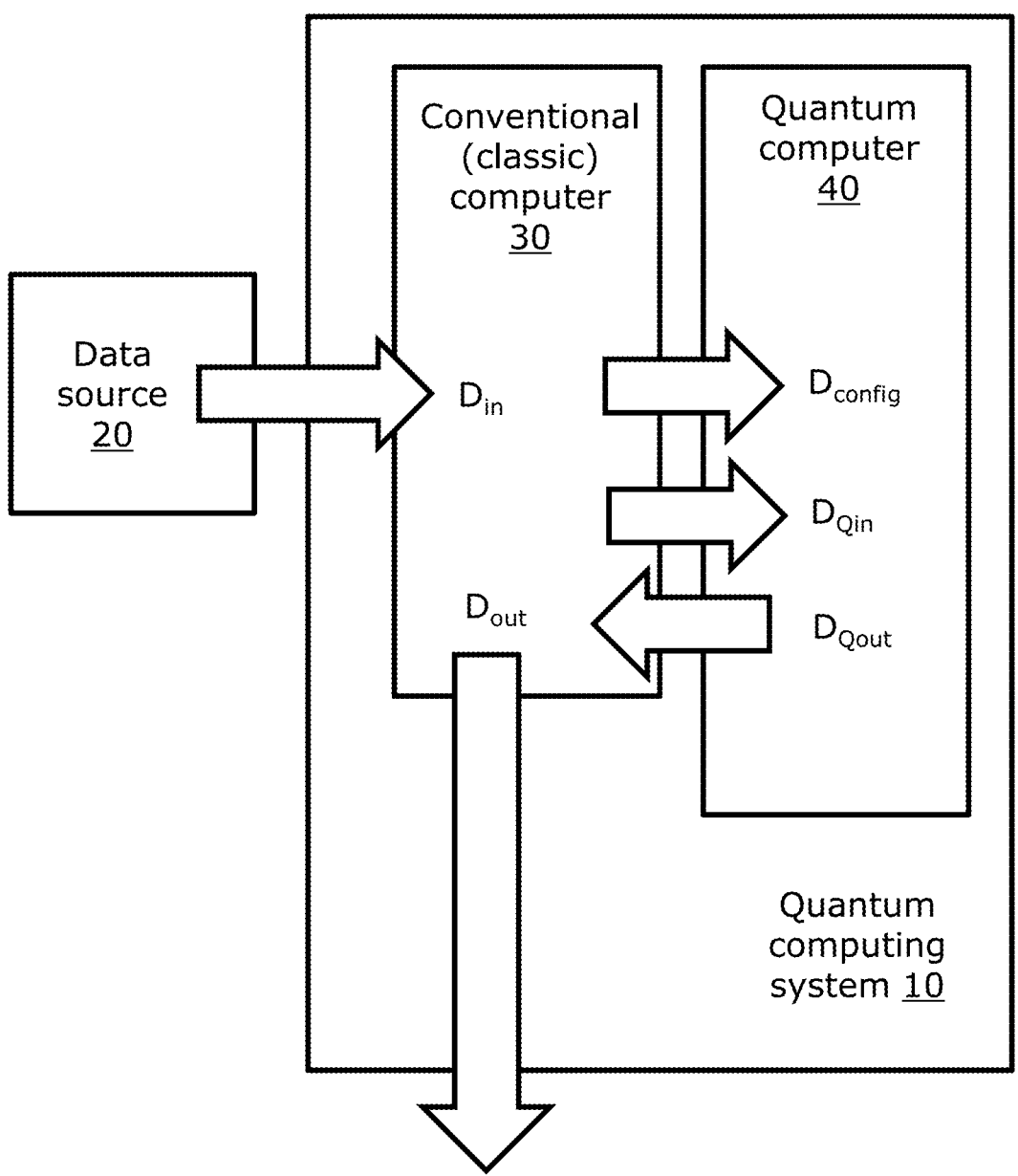
FIG. 1 is an illustration of a quantum computing system of the present disclosure, wherein the quantum computing system is a hybrid combination of a convention computer and a quantum computer.

In the accompanying diagrams, an underlined number is employed to represent an item over which the underlined number is positioned or an item to which the underlined number is adjacent. When a number is non-underlined and accompanied by an associated arrow, the non-underlined number is used to identify a general item at which the arrow is pointing.

DETAILED DESCRIPTION

In general overview, contemporary computing hardware, for example configured to use Silicon-based integrated circuits and associated data memory devices for performing data processing, becomes more computationally powerful and faster as feature sizes of its integrated circuits become smaller. As circuit feature sizes approach nanometre-scale, Heisenberg's uncertainty principle and quantum effects become more significant in circuit design and operation. In the limit, using single particles, for example ions or photons, to represent data, namely in a form of qubits, represents a limit of miniaturization and provides a fastest computing performance, especially when phenomena such as superposition and entanglement are used; such an approach is used in contemporary quantum computers.

A general introduction to quantum computation and quantum information is provided in a scientific publication "*Quantum computations and quantum information*", Nagy et al., The International Journal of Parallel, Emergent and Distributed Systems, Vol 21, No. 1, February 2006, pp. 1-59.

In some cases, quantum computers and quantum computing systems may exploit the quantum nature of fields and particles to increase the computation speed compared to classical computers to enable solving computationally complex problems within timeframes suitable for practical applications.

In conventional processing of data, wherein the data is representative of real physical signals for example, many mathematical operations such as computations of means, correlations, Fourier transforms, Hadamard transforms and so forth are required for processing the data. The data to be processed may be considerable in size, for example Terabytes of information, even potentially Petabytes of information, for example acquired from sensor arrays. Processing time and associated latency for processing the data are important factors, for example in real-time control situations. A quantum computer is potentially capable of being configured to process large quantities of data in a highly efficient manner. However, a challenging technical problem is how to configure quantum computers in a most optimal manner to implement such data processing.

In a published international PCT application WO2015/188025A1, "*Quantum Algorithms for Arithmetic and Function Synthesis*" (Microsoft Technology Licensing LLC), there is described quantum circuits and associated methods that use Repeat-Until-Success (RUS) circuits to perform approximate multiplication and approximate squaring of input values supplied as rotations encoded on ancilla qubits. So-called "gearbox" and programmable ancilla circuits are coupled to encode even or odd products of input values as a rotation of a target qubit. In other examples, quantum RUS circuits provide target qubit rotations that are associated with reciprocals using series expansion representations.

It is conventional practice to use a combination of a conventional (classic) computer and a quantum computer when seeking to solve extremely complex problems; in the present disclosure, such a combination will be referred to as a quantum computing system. The conventional computer uses Silicon integrated circuit devices that are configured to operate at substantially room temperature (circa+20° C.), whereas the quantum computer is configured to be cooled to cryogenic temperatures (circa −273° C.) in order to function. When tackling a given computing task, the task can be divided between execution on the classic computer and execution on the quantum computer. Moreover, for certain tasks, the classic computer will be more efficient than the quantum computer for handling simple computational tasks, whereas the quantum computer can potentially solve certain types of computation tasks that would be inefficient to perform on the classic computer. However, transferring tasks between the classic computer and the quantum computer has temporal overhead that is preferably reduced as much as possible in order to achieve an optimal computing performance for the quantum computing system.

When using such a tandem configuration of a classic computer and quantum computer, it is sometimes convenient, for example to enhance data processing throughput, to perform certain arithmetic computations on the quantum computer rather than on the classic computer. A technical problem that arises therefrom is how to configure a quantum computer most effectively for performing certain types of arithmetic computations in a most efficient manner, thereby enabling the quantum computer to be used to a greater extent to process the computational task.

FIG. 1, illustrates a schematic diagram of a quantum computing system 10, that is coupled to a data source 20. In some examples, the quantum computing system 10 may receive data (e.g., input data) from the data source 20 and transmit data (e.g., output data) to the data source 20. In some implementations, the quantum computing system 10 may include at least a conventional classic computer 30 (also referred to as classical computer or binary data computer) and a quantum computer 40 in communication with the binary data computer. In some cases, classic computer 30 may be in communication with the quantum computer 40. In some examples, the classic computer 30 may be coupled in combination with the quantum computer 40. The classic computer 30 may exchange data with the quantum computer 40 via one or more data links. In some examples, the classic computer 30 may comprise a non-transitory memory and at least one electronic processor configured to execute computer-executable instructions (e.g., software instructions, or program instructions) stored in the non-transitory memory. In some examples, the electronic processor may be implemented using Silicon integrated circuits that perform binary digital computations when is use. The one or more data processors can be configured to execute software instructions for processing the input data $D_{in}$ to generate the output data $D_{out}$ with assistance from a quantum computer 40 that is coupled to the convention classic computer 30.

The memory may be a non-volatile memory, such as flash memory, a hard disk, magnetic disk memory, optical disk memory, or any other type of non-volatile memory. Furthermore, types of memory may include but are not limited to random access memory ("RAM") and read-only memory ("ROM"). In some examples, the classic computer 30 can be programmed to perform different procedures each implemented based on a different set of instructions.

In some cases, the electronic processor of the classic computer 30 may execute the computer-executable instructions to receive input data ($D_{in}$) from the Data source 20, process the input data ($D_{in}$) to generate quantum computer input data (DQin), and transmit DQin to the quantum computer 40. Additionally, the electronic processor of the classic computer 30 may send data ($D_{config}$) usable for configuring the quantum computer 40 (e.g., configuring one or more quantum gates of the quantum computer 40). In some cases, $D_{config}$ may be stored in a memory of the classic computer 30. In some other cases, electronic processor of the classic computer may generate $D_{config}$ based at least in part on the data stored in a memory of the classic computer. In some cases, $D_{config}$ may be provided by a user via a user interface (e.g., a user interface of the classic computer 30).

In some examples, DQin may include optional data pertaining to instructions that may be executed or used by a controller of the quantum computer to control and manage certain operational aspects of the quantum computer. In some examples, the optional data included in DQin may comprise instructions usable by a compiler (e.g., a quantum compiler) that is executed by the controller of the quantum computer, for example, to mitigate errors, and managing qubit placement.

In some cases, the data source 20 includes, for example, one or more of: a data memory with data stored therein, a sensor arrangement that is configured to stream sensor data, a user interface. In some embodiments, the data memory source may include an electronic memory configured to store computer-executable data. The data may include, data received from a user, another computing system (e.g., classical or quantum computing system), or a sensor. In some examples, the sensor arrangement includes sensors generating sensor data in real-time, satellite streamed data, camera surveillance systems, genomic data PCR readout machines, MRI 3-D imaging machines, encryption devices and so forth.

Alternatively or additionally, the input data Di may be provided from other sources, for example financial trading data, parameters of physical systems to be modelled, and so forth.

The quantum computer 40 is used by the conventional classic computer 30 to perform particularly computationally complex tasks that would take the conventional classic computer 30 an unacceptably long period of time to process. The quantum computer 40 may comprise one or more quantum circuits acting on qubits configured to perform certain computationally complex tasks using quantum effects. In various implementations, the quantum computer 40 may include one or more qubits and one or more quantum gates. In some cases, the quantum gates may comprise one or more rotation gates. Rotation gates as used in the present disclosure are also known as 'phase gates', and 'phase rotation gates' terms used in the priority applications.

The quantum circuits may comprise at least a portion of the one or more qubits and one or more quantum gates.

In some implementations, the quantum computer 40 includes in a range of 30 to 1000 qubits, more optionally in a range of 50 to 500 qubits, and various gates that enable quantum parameters such as qubit phase to be modified (namely, rotation operations R) as well as and entanglement and superposition operations between qubits to be performed. In some examples, the quantum computer 40 is configured to perform quantum noise reduction to reduce quantum computational errors arising therein. Moreover, in certain configurations of the quantum computer 40, its qubits and quantum gates are cooled to cryogenic temperatures when in operation, for example to within 1 Kelvin of absolute zero temperature. Optionally, the quantum computer 40 is implemented using photonic devices, cryogenic superconducting gates or ion traps, or a combination thereof. Optionally, the conventional classic computer 30 is spatially remote from the quantum computer 40, and data exchange occurs therebetween via one or more data communication links, for example an Internet data link.

In some implementation, the quantum computing system 10 (also referred to as quantum computing system 10), may be configured to execute computer-executable instructions (e.g., program instructions) to process input data ($D_{in}$) to generate corresponding output data ($D_{out}$). The computer executable instructions may be executed by one or more electronic hardware processors of the quantum computing system. In some cases, the program instructions can include one or more arithmetic functions and the quantum computing system may be configured to apply a transformation to transform the one or more arithmetic functions into a series of Fourier components. In some cases, the Fourier components can be executable by the quantum computer 40 using one or more quantum circuits. For example, the quantum circuits may utilize rotation gates acting on qubits representing the Fourier components and generate outputs. In some examples, one or more quantum circuits of the quantum computing system may be configured based at least in part on the Fourier components to process qubits having initial states prepared based at least in part on $D_{in}$. In some cases, $D_{in}$ may comprise data associated with a probability distribution function. In some cases, the quantum computer 40 may generate the outputs using at least $D_{in}$ and the Fourier components of the arithmetic function. The quantum computer 40 may further process the outputs received from the one or more quantum circuits to generate results of the one or more arithmetic functions, wherein the results are used to generate the corresponding output data ($D_{out}$). In some cases, the results may be associated with one or more statistical properties of $D_{in}$. In some examples, $D_{out}$ may comprise a value of an arithmetic function computed based on values of one or more random variables associated with a probability distribution (e.g., a marginal distribution).

In some implementations, the quantum computer 40 may operate by processing a sequence of "shots". In some cases, initial states may be defined (Ansatz) and each shot may include, preparing qubits having the defined initial state and performing a temporal sequence of quantum operations on the qubits to generate processed qubits having final states. In some cases, the initial states may comprise zero states. In some cases, the quantum computer 40 may generate the processed qubits having the final states by altering the initial states. In some cases, the quantum computer 40 may readout the final state of the processed qubits using measurement operations (e.g., quantum measurement operations).

In some implementations, the quantum computer 40 may include one or more quantum circuits configured to process qubits. In some cases, a number of quantum operations performed by quantum circuit and/or the longest path in the quantum circuit may be referred to as "quantum circuit depth". In some cases, a path in the quantum circuit may comprise a sequence of quantum operations performed to transform the initial quantum states to the final quantum states.

Each shot may have a temporal duration that, in some cases, can be limited by quantum noise arising in the qubits, wherein the quantum noise can be manifest as qubit decoherence. In some examples, quantum noise arising in qubits increases as more quantum operations are performed on the qubits. As such, the quantum noise may increase with the corresponding quantum circuit depth. Despite such technological challenges, for certain types of computational tasks, the quantum computer 40 is extremely effective. Some of the methods disclosed herein may reduce the quantum circuit depth of the quantum circuits configured to generate outputs usable for computing a value of an arithmetic function based on values of one or more random variables associated with a probability distribution (e.g., a marginal distribution). Advantageously, these methods may reduce the quantum circuit depth without significantly increasing the computation time (e.g., a convergence time) and/or an error associated with the computed value.

In some cases, the data $D_{config}$ can be generated during execution of the aforesaid software instructions prior to run-time of quantum computer 40. In some examples, $D_{config}$ may include data usable for configuring one or more quantum circuits of the quantum computer 40 based at least in part on an arithmetic function. In some such cases, at least a portion of the software instructions may include a special compiler that upon execution generates $D_{config}$ by compiling another portion of instructions (e.g., configuration instructions), representing a configuration of the quantum computer. In some examples, $D_{config}$ may comprise data and/or instructions executable by the quantum computer 40 to configure the quantum circuits therein according to the configuration instructions.

For example T|ket> compiler provided by Cambridge Quantum Computing Ltd., can convert a portion of the instructions into Hamiltonian functions that are subsequently processed during compilation to generate Pauli strings from which corresponding Pauli gadgets are derived, wherein the Pauli gadgets are then used to define configuration connections for quantum gates of the quantum computer 40, for example thereby creating a given quantum circuit. Such a process of converting Hamiltonian functions eventually to configuration connections for quantum gates is, for example, described in an IBM publication "*Circuit optimization of Hamiltonian simulation by simultaneous diagonalization of Pauli clusters*", Ewout van den Berg and Kristan Temme, IBM T.J. Watson, Yorktown Height, NY, USA, 31 Mar. 2020. The entire contents of this IBM publication are incorporated by reference herein and made a part of this specification. Moreover, a publication "*A compact ion-trap quantum computing demonstrator*", Pogorelov et al. describes a practical implementation of the quantum computer 40, the entire contents of this publication are incorporated by reference herein and made a part of this specification In some cases, a quantum compiler may convert a first quantum circuit or a symbolic form of a first quantum circuit to second quantum circuit or a symbolic form of a second quantum circuit where the second quantum circuit or the symbolic form of the second quantum circuit comprise 'native gates' for the target hardware. In implementations, the T|ket> compiler may reduce the corresponding quantum circuit depth (e.g., the quantum circuit depth of the second quantum circuit or its symbolic form. In some examples, the T|ket> compiler may reduce the quantum circuit depth by at least removing some manifest redundancies in the quantum circuit.

It will be appreciated that the aforesaid software instructions can relate to a plurality of types of computation that process data in manner to generate a technical effect, for example for implementing data encryption, data decryption, for filtering measurement data representative of measured physical parameters to reduce stochastic noise in the data, correlating measurement data to detect occurrence of a signal feature that is masked by stochastic noise and so forth. The quantum computing system 10 is thereby capable of providing a technical effect when processing data.

In some applications computation may require an arithmetic function to be computed. In some cases, a value an arithmetic function applied on one or more random variables having values associated with a probability distribution may be desired. In some cases, it is desirable that arithmetic computations are performed on the quantum computer 40 (e.g., to reduce the computation time). The arithmetic computations optionally include a mean (namely, a numerical or numeral average) to be computed, for example a mean of random variables or a variance of random variables. Alternatively or additionally, the types of computation often require a covariance or correlation between groups of variables to be computed, for example to determine a feature that is present in common between a plurality of sets of data, for example genetic readout data. For example, it may be advantageous to use quantum computing to estimate a mean of some function of random variables, for example for samples from a multivariate probability distribution that is particularly challenging and time-consuming to compute using the contemporary computer 30 alone, without support from the quantum computer 40. When reading out the aforesaid qubits, various methods can be used to reduce readout noise of the qubits; such methods include quantum amplitude estimation (QAE) requiring shots to be repeated to enable an average of output to be computed from which a best estimate of qubit value can be calculated. For achieving an optimal data processing throughput of the quantum computing system 10, it is often advantageous to reduce an amount of switching of tasks between the quantum computer 40 and the conventional classic computer 30.

Thus, from the foregoing, it will be appreciated that, in order to obtain a maximum performance from the quantum computing system 10, it is desirable that some of the aforesaid shots enable arithmetic computations to be performed on the quantum computer 40 in preference to using the conventional classical computer 30. In the present disclosure, there is provided an especially effective and efficient method of implementing such arithmetic computations using the quantum computer 40.

In overview, embodiments of the present disclosure benefit from an appreciation that quantum computers are generally extremely efficient at applying rotation operations to their qubits. Moreover, embodiments of the present invention also benefit from an appreciation that arithmetic function can be transformed to be represented as a Fourier series, wherein harmonics of the Fourier series can be individually computed using a series of shots executed by the quantum computers. This enables certain types of tasks to be kept to execution in the quantum computers rather than having to switch inefficiently between performing computations on conventional classical computers and quantum computers that mutually configured together. In the following, a theoretical basis for such a transformation of arithmetic function is provided, together with examples of quantum circuits that enable arithmetic computations to be performed on quantum computers.

Figure 6:
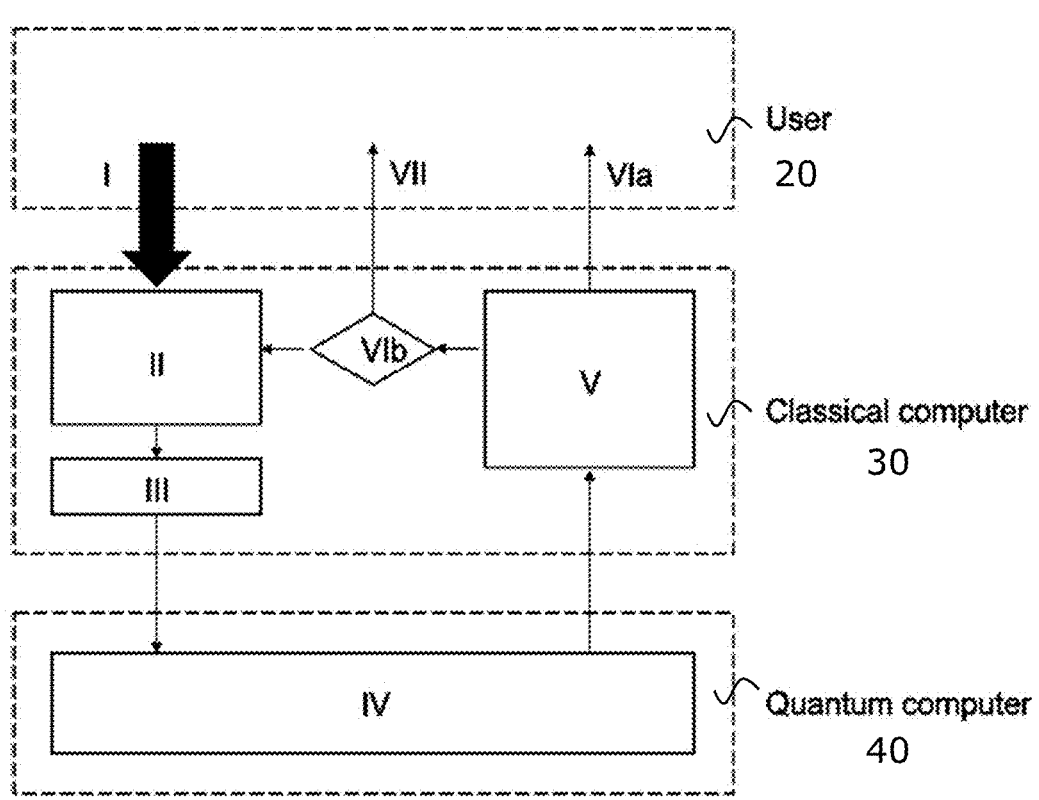
FIG. 6 is a flow chart of a process that may be performed by the quantum computing system of FIG. 1 for implementing embodiments of the present disclosure.

The aforesaid method of (namely, method for) implementing arithmetic functions as Fourier series executed on a quantum computer as rotation operations on qubits will next be described in greater detail with reference to FIG. 6 that depicts a flow chart of an algorithm, wherein the algorithm includes a sequence of steps I to VIb that will next be described in greater detail with respect of implementation on the quantum computing system 10.

In the step I, when providing the input data $D_{in}$, a user passes in:

(i) a circuit P;

(ii) a description for how to interpret a state prepared by P as a probability distribution;

(iii) a stopping criterion (for example, at least one of: a desired accuracy, a maximum number of uses, a time limit); and (iv) a function to be applied to samples represented by the qubits.

In the step II, the conventional classical computer 30 constructs a list of tuples $\{A, m, N_{shots}\}$, wherein A is a definition of quantum circuit to be implemented using the quantum computer 40, m is a non-negative integer and $N_{shots}$ is a positive integer.

In the step III, a quantum circuit Q is constructed from A (namely, a standard requirement in quantum amplitude estimation (QAE) (for example, see an article Suzuki et al. Amplitude estimation without phase estimation, arXiv: 1904.10246v2 [quant-ph] Jan. 27, 2020], the entire contents of which are incorporated by reference herein and made a part of this specification). For each element in the tuple, a further tuple $\{G, Nshots\}$ is prepared, wherein $G=Q^mA$ is a quantum circuit. This second tuple is then passed from the classical conventional computer 30 to the quantum computer 40, optionally using a quantum compiler such as aforesaid T|ket> quantum compiler to optimise and format the second tuple correctly to run on the quantum computer 40.

In the step IV, for each element in the further tuple, the quantum computer 40 runs $N_{shots}$ shots of G, and then measures final states of the qubits and returns the measurement outcomes to the convention classical computer 30.

In the step V, the conventional classic computer 30 uses quantum data representative of the measured final states of the qubits, namely quantum data, to calculate an estimate of interest.

In the step VIa, in a non-adaptive case, the estimate calculated in the step V is returned to the user 20. Alternatively or additionally, in the step VIb, in an adaptive case, a decision is made whether to return the estimate for the step VII or to use the quantum data to perform another iteration of the steps II to V in order to improve computation accuracy of the computation performed by the quantum computer 40.

As aforementioned, the data source 20 can be a user that may be either a human user or a conventional classical computer communicating with the steps of the method via an appropriate software interface, for example an application programming interface (API).

Figure 2A:
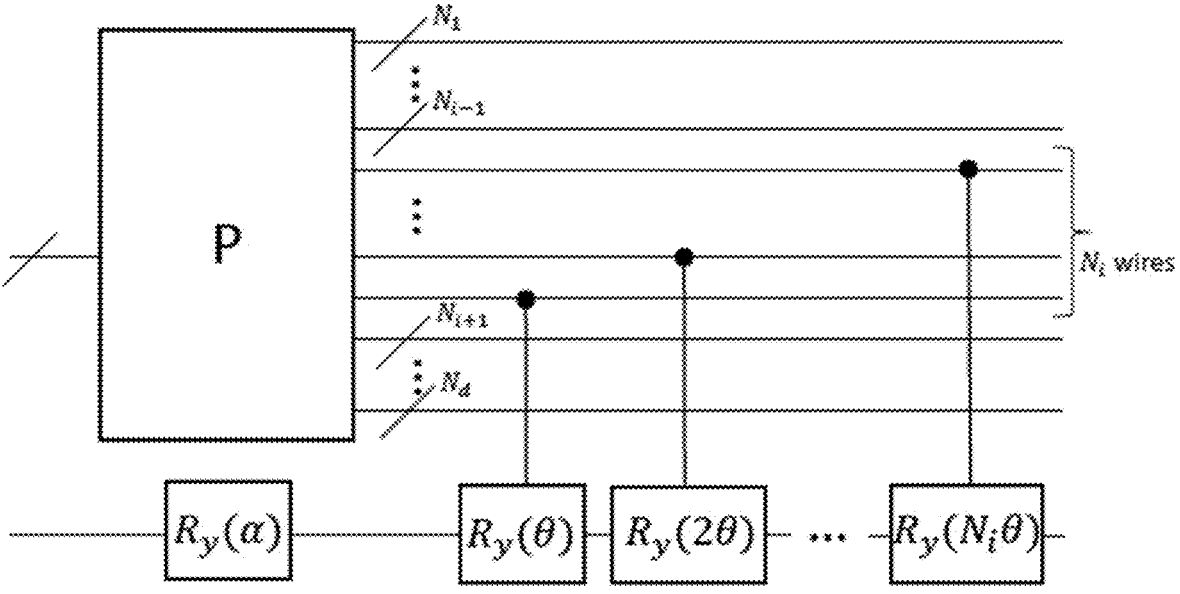
FIG. 2A is an illustration of a quantum gate configuration used in the quantum computer of FIG. 1 for determining means or variances of variables.
Figure 2B:
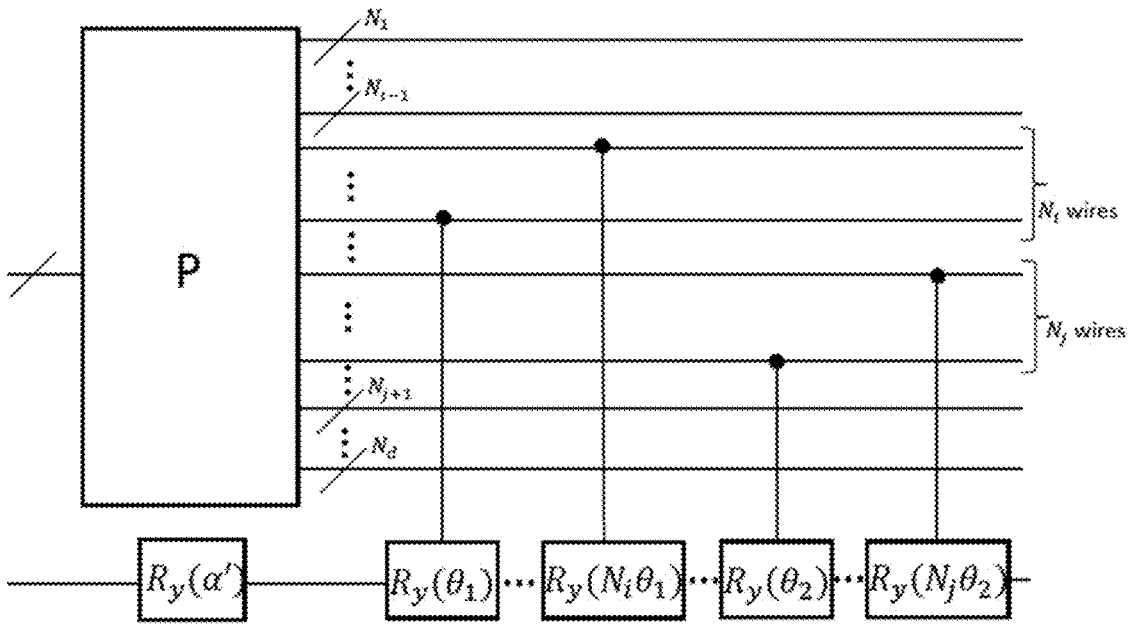
FIG. 2B is an illustration of a quantum gate configuration used in the quantum computer of FIG. 1 for determining covariances or correlations of sets of variables.
Figure 2C:
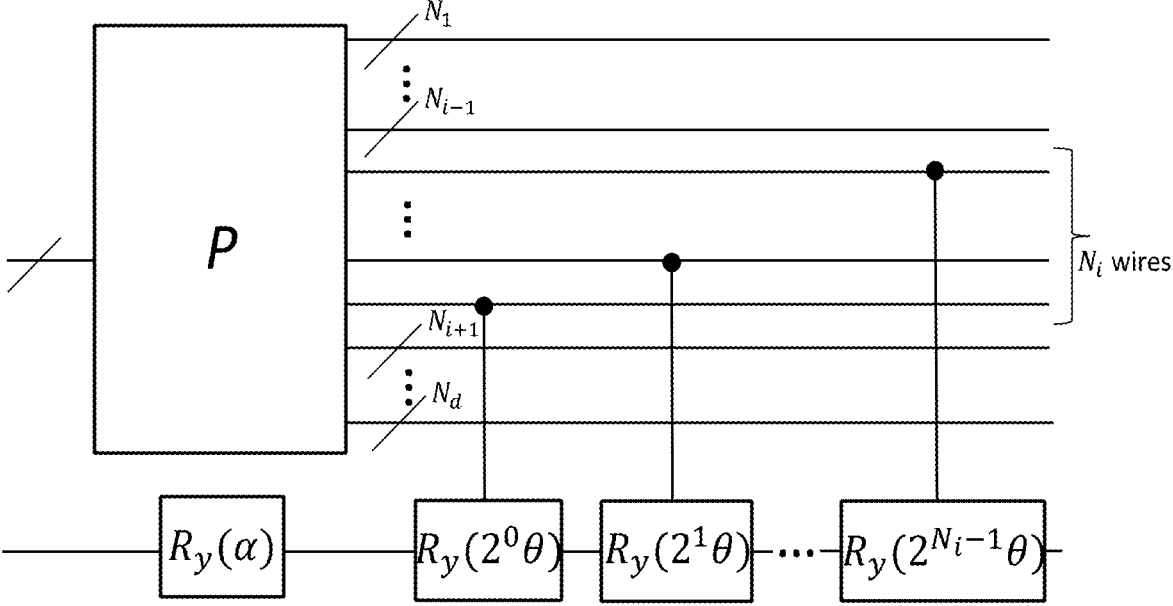
FIG. 2C is an illustration of a quantum gate configuration used in the quantum computer of FIG. 1 for determining a function applied to a single variable.

An example of a quantum circuit for executing a function on a single random variable on the quantum computer 40 is shown in FIG. 2C. In FIG. 2C, qubits are denoted by horizontal lines, referred to as "wires", and rotation quantum gates are denoted by boxes including a symbol "$R_y$" to denote a qubit rotation operation. In FIG. 2C, there is shown an example of constructing aforesaid A from aforesaid P and user-inputting data when the function applied is to only a single random variable.

In FIG. 2C, a user dictates that a state prepared by P is a d-dimensional multivariate distribution, of which an $i^{th}$ dimension is the one of interest. Support of the $i^{th}$ dimension is specified by $x_i$, namely a minimum, and a gap between data points $\Delta$; for example, a four-point probability distribution taking values 0, 2, 4 and 6 would have $x_i=0$ and $\Delta=2$. From these values, there can be calculated:

$$\alpha = n\omega x_1 - \beta \text{ and } \theta = n\omega\Delta$$

wherein other parameters (namely, n, $\omega$ and $\beta$) depend on a Fourier series of the function applied.

The user dictates that the state prepared by P is a d-dimensional multivariate distribution, of which the $i^{th}$ and $j^{th}$ dimensions are of interest. The parameters of the $R_y$ rotations are again determined by the user-inputted definitions of the support of the $i^{th}$ and $j^{th}$ dimensions and also the Fourier series decomposition of the function applied.

Next, an example of calculating a mean using the quantum computing system 10 will be described. The user 20 wants to calculate a mean, and a corresponding support of an (N-point) distribution is contained in the region between 1 and 2 (namely, $1 < x_i$, $x_i+(N-1)\Delta < 2$). In this case, it is necessary to construct a piecewise periodic function, $f(x)$ such that $f(x)=x$ wherein $1 < x < 2$. A suitable choice for such a piecewise periodic function is, for example:

$$f(x) = \begin{cases} \frac{1}{2} + \frac{x^2}{2} & \text{if} -1 \le x < 1 \\ x & \text{if } 1 \le x < 2 \\ 2.5 - \frac{(x-3)^2}{2} & \text{if } 2 \le x < 4 \\ 6-x & \text{if } 4 \le x < 5 \end{cases}$$

which has Fourier series decomposition:

$$f(x) = c + \sum_{n=1}^{\infty} \frac{a'_n}{n^3} \cos(n\omega_0 x)$$

-continued wherein:

$$c = 1.5$$

$$a'_n = -\frac{2}{3}\left(\frac{3}{\pi}\right)^3 (\sin(n\pi/3) + \sin(2n\pi/3))$$

$$\omega_0 = \frac{\pi}{3}$$

From this, it is feasible to construct circuits of the form of FIGS. 2A to 2C, using $\omega = w_0$, $\beta = 0$, and for a range of n up to some $n_{max}$. In particular, for each n, there is assigned $$N_{shots} = q_n^{(a)},$$

where:

$$q_n^{(a)} = k|a_n|^{2/(\lambda+1)}$$

Where $\alpha_n = \alpha_n'/n^3$, and $\lambda = 2$ for quantum amplitude estimation subroutines that achieve the full quadratic quantum advantage and k is such that:

$$q_{tot} = \sum_{n=1}^{n_{max}} q_n^{(a)}$$

Moreover, it is required that $$q_n^{(a)}$$

is an integer of some specified minimum value. This in turn implicitly fixes $n_{max}$.

This defines the circuits which are to be run on the quantum computer 40, and how many shots of each are run. Some standard quantum amplitude estimation algorithm is used to estimate the amplitude of the final qubit of the quantum computer 40 for each n. For such an estimation algorithm, by letting $$\mu_n^{(a)}$$

be 1 minus 2 times this value for each n, the estimate of the mean can be returned as:

$$\text{Return } c + \sum_{n=1}^{n_{max}} a_n \mu_n^{(a)}$$

There are two more general points worth noting from this specific example:

(i) as the mean is a linear function of the probability distribution, it is possible to assume that the support is always such that: $1 < x_l$, $x_l + (N-1)\Delta < 2$, and to shift and scale the returned value accordingly to match the user-defined support;

(ii) the method of assigning uses to harmonics of a Fourier series (namely different values of n) is generally applicable.

In particular, a purely even function has a Fourier series decomposition that only has cosine components, but in general the Fourier series decomposition will be of the form:

$$f(x) = c + \sum_{n=1}^{\infty} a_n \cos(n\omega_0 x) + \sum_{n=1}^{\infty} b_n \sin(n\omega_0 x)$$

wherein the uses assigned to each harmonic will be:

$$q_n^{(a)} = k|a_n|^{2/(\lambda+1)}$$

$$q_n^{(b)} = k|b_n|^{2/(\lambda+1)}$$

for some constant k chosen such that:

$$q_{tot} = \sum_{n=1}^{n_{max}} q_n^{(a)} + q_n^{(b)}$$

Figure 2D:
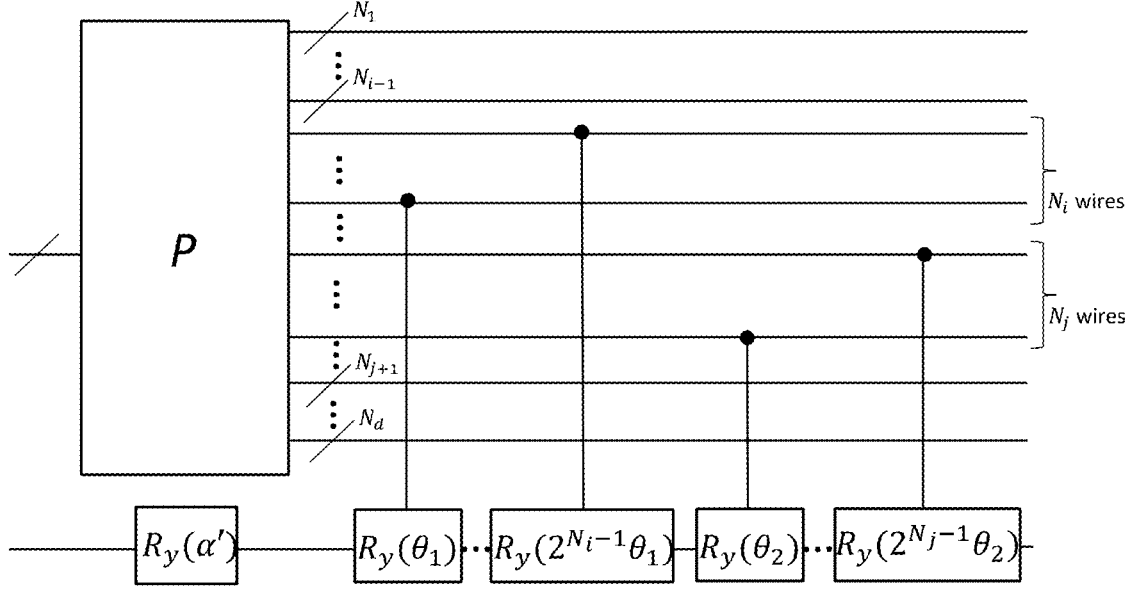
FIG. 2D is an illustration of a quantum gate configuration used in the quantum computer of FIG. 1 for determining a function applied to double variables.

In FIG. 2D, there is shown an example of constructing A from P and user-inputting data when a function applied relates to two correlated random variables. In the example, the user dictates that the state prepared by P is a d-dimensional multivariate distribution, of which the $i^{th}$ and $j^{th}$ dimensions are of interest. Parameters of $R_y$ rotations in FIG. 2D are again determined by the user-inputted definitions of the support of the $i^{th}$ and $j^{th}$ dimensions and also the Fourier series decomposition of the function applied. In FIG. 2D, the circuit is implemented by a combination of single qubit operators in the form of $R_y$ rotation gates providing $R_y$ rotations. The rotation gates are arranged to function in a temporal series as illustrated.

To give a concrete example of the above, there is considered a case where the user wants to calculate the mean, and the support of the (N-point) distribution is contained in the region between 1 and 2 (namely, $1 < x_l$, $x_l + (N-1)\Delta < 2$). In this case, it is necessary to construct a piecewise periodic function, $f(x)$ such that $f(x) = x$ when $1 < x < 2$. A suitable choice is:

$$f(x) = \begin{cases} \frac{1}{2} + \frac{x^2}{2} & \text{if } -1 \le x < 1 \\ x & \text{if } 1 \le x < 2 \\ 2.5 - \frac{(x-3)^2}{2} & \text{if } 2 \le x < 4 \\ 6 - x & \text{if } 4 \le x < 5 \end{cases}$$

which has Fourier series decomposition:

$$f(x) = c + \sum_{n=1}^{\infty} \frac{a'_n}{n^3} \cos(n\omega_0 x)$$

wherein:

$$c = 1.5$$

$$a'_n = -\frac{2}{3}\left(\frac{3}{\pi}\right)^3 (\sin(n\pi/3) + \sin(2n\pi/3))$$

$$\omega_0 = \frac{\pi}{3}$$

Figure 4:
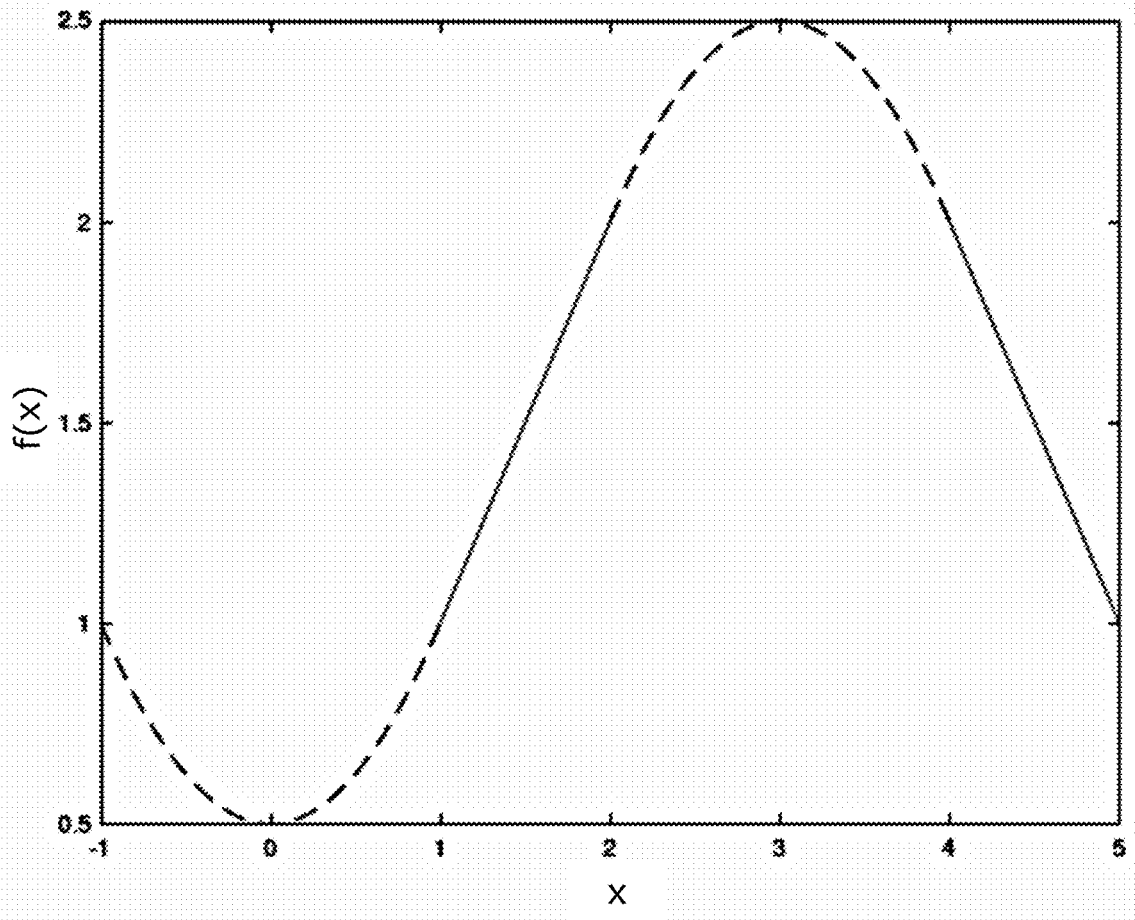
FIG. 4 is an illustration of a plot of an example periodic function constructed piecewise, with alternating pieces depicted using dashed lines and solid lines.

FIG. 4 is a plot of an example periodic function ($f(x)$): constructed piecewise, with alternating pieces depicted using dashed lines and solid lines. It is seen that for $1 \leq x < 2$ (i.e., the first solid line), $f(x)=x$ as required.

From this, quantum circuits can be constructed of the form shown in FIG. 2D, using $\omega = w_0$, $\beta = 0$, and for a range of n up to some $n_{max}$. In particular, for each n there are assigned $$N_{shots} = q_n^{(a)},$$

wherein:

$$q_n^{(a)} = k|a_n|^{2/(\lambda+1)}$$

and wherein $\lambda = 2$ for quantum amplitude estimation subroutines that achieve the full quadratic quantum advantage and k is such that:

$$q_{tot} = \sum_{n=1}^{n_{max}} q_n^{(a)}$$

and wherein $$q_n^{(a)}$$

is required to be an integer of some user specified minimum value. This in turn implicitly fixes $n_{max}$.

In some cases, $n_{max}$, can be an upper bound for the number of Fourier components used for representing $f(x)$. In some such cases, $n_{max}$ may be determined by a truncating arrangement to restrict a total number of the Fourier components or a total number of the executable Fourier components. In some examples, $n_{max}$ may be determined based at least in part on a value of the error (e.g., a mean square error) incurred by the truncation. Additional or alternatively $n_{max}$ may be determined based at least in part on a number of uses assigned to a quantum circuit representing each Fourier component.

This defines the circuits which are run on the quantum computer 40, and how many shots of each are run. Some standard quantum amplitude estimation algorithm is used to estimate the amplitude of the final qubit for each n. Let $$\mu_n^{(a)}$$

be 1 minus 2 times this value for each n. From this, we can return the estimate of the mean as:

$$\text{Return } c + \sum_{n=1}^{n_{max}} a_n \mu_n^{(a)}$$

From the foregoing, following points are usefully noted:

(i) as the mean is a linear function of the probability distribution, it is possible to assume that the support is always such that: $1 < x_j$, $x_j + (N-1)\Delta < 2$, and to shift and scale the returned value accordingly to match the user-defined support; and (ii) the method of assigning uses to the harmonics (namely, different values of n) is generally applicable. In particular, here we have a purely even function and show the Fourier series decomposition only has cosine components, but in general the Fourier series decomposition will be of the form:

$$f(x) = c + \sum_{n=1}^{\infty} a_n \cos (n\omega_0 x) + \sum_{n=1}^{\infty} b_n \sin (n\omega_0 x)$$

wherein the uses assigned to each harmonic will be:

$$q_n^{(a)} = k|a_n|^{2/(\lambda+1)}$$

$$q_n^{(b)} = k|b_n|^{2/(\lambda+1)}$$

For some constant k chosen such that:

$$q_{tot} = \sum_{n=1}^{n_{max}} q_n^{(a)} + q_n^{(b)}$$

In the Appendix of the present disclosure, there is also provided a detailed description of a method of (namely, a method for) computing covariances or correlations of multiple variables; for example, the multiple variables can be input to the quantum computing system 10 as sets of data; for example, the sets of data can be derived from sensor arrays, from a DNA sequencing machine (for example, obtained from Illumina Inc. or Qiagen Inc. DNA sequencing apparatus), from image sensors and so forth. For example, covariance or correlation computations can be used to reduce stochastic noise in measurement data, or for finding specific features of signals that may be masked by stochastic noise in measurement data (for example, when processing noisy images generated by radar surveillance systems).

In the Appendix of the present disclosure, there is provided a detailed description of a method for numerically estimating a mean (namely, a numerical or numeral average) of a function of random variables that are sampled from a multivariate probability distribution. The distribution is encoded into a quantum state to be processed in the quantum computer 40. It will be appreciated that quantum noise arises in the quantum computer 40 when the computer 40 is in operation; such quantum noise causes errors in computations to arise. The proposed method elucidated in the Appendix for computing the mean converges very rapidly, that enables the quantum computer 40 to achieve a very high computation rate; convergence in terms of rate that is thereby susceptible to being achieved results in a decrease of mean-squared error that is proportional to a square of an inverse of a number of uses of a state preparation circuit, P. In the method, a probability is represented by a quantum state $|p>$, wherein p is a discrete probability distribution. Correspondingly, the state preparation circuit P is a circuit of the quantum computer 40 that prepares the quantum state $|p>$. Moreover, the state preparation circuit P is such that $|p> = P|0>$.

The method includes following steps as illustrated in FIG. 3:

Step 1 200: constructing a smooth, periodic function $f(x)$ from a function $g(x)$, wherein $g(x)$ is a continuous function that has a continuous first derivative supporting over a probability function $p(x_{(i)})$ wherein p is a discrete probability distribution to be processed; wherein, when there is a plurality of the periodic function $f(x)$, namely $f_1(x)$, $f_2(x)$ . . . , the plurality applies to mutually different dimensions of a multivariate probability density function (PDF);

Step 2 210: symbolically expressing the function $f(x)$ in terms of Fourier coefficients in respect of harmonic frequency intervals; wherein, when there is a plurality of the function $f(x)$, such expressing in terms of Fourier coefficients is used for each of the plurality of the function $f(x)$;

Step 3 220: constructing a symbolic form of quantum circuit A for each Fourier coefficient from Step 2;

Step 4 230: assigning a number of uses of the quantum circuit A for estimating each Fourier component;

Step 5 240: running a quantum amplitude estimation (QAE) for each Fourier coefficient (namely, running the aforesaid "shots"); and Step 6 250: from Step 5, returning an expectation value of one or more of computed mean, variance and correlation.

It will be appreciated that Step 5 can be very efficiently implemented by using series of rotation gates, for example in a manner as illustrated in on FIGS. 2A to 2C, that are, from a practical perspective, readily implementable using the quantum computer 40. In the circuits in FIGS. 2A to 2C, qubit operators in the form of rotation gates are used. The rotation gates are arranged to function in a temporal series as illustrated. Rotation gates as used in the present disclosure are also known as 'phase gates', and 'phase rotation gates' terms used in the priority applications.

In step 1, the periodic function $f(x)$ is optionally an even, smooth periodic function. Moreover, in the method, the preparation quantum circuit P is given a stopping criterion that defines when the quantum computation has been completed. Alternatively, in certain implementations, the periodic function $f(x)$ is optionally an odd, smooth periodic function.

Beneficially, the Steps 1 to 6 (namely, denoted by 200 to 250) are implemented in an adaptive manner. Moreover, the method that is outlined in Steps 1 to 6 above can be used as a part of an adaptive algorithm in a variety of mutually different ways. Furthermore, the Step 5 240 is beneficially supplemented by an application of Bayes' rule to a posterior distribution from a prior distribution when the Steps 4 and 5 240, 250 are performed in an iterative manner.

In FIG. 2A, there is shown a representation of the aforementioned quantum circuits P, A that are determined from the aforesaid method for computation of means or variances, for example numerical means. The circuit A is implemented by a combination of single qubit operators in the form of rotation gates. The rotation gates are arranged to function in a temporal series as illustrated. The quantum circuit P is described in greater detail below. In some cases, the circuit A may be represented as $A_n(b)$ and may comprise the rotation gates $R_y(\alpha)$, $R_y(\theta)$, $R_y(2\theta)$, . . . . $R_y(N_i\theta)$, wherein $\alpha = n\,\omega_0\,x_i - \beta$ and $\theta = n\omega_0\Delta$.

In FIG. 2B, there is shown another representation of the aforementioned quantum circuits P, A that are determined from the aforesaid method for computation of covariances or correlations. In some cases, the circuit A (configured for estimating covariance), may be represented as $A_{n,m}$ and may comprise the rotation gates $R_y(\alpha')$, $R_y(\theta_1)$, . . . . . $R_y(\theta_2)$, . . . . $R_y(N_j\theta_2)$, wherein $\alpha' = n\,\omega_0^{(i)}\,x_i^{(i)} + n\,\omega_0^{(2)}x_i^{(i)}$, $\theta_1 = n\,\omega_0^{(i)}\Delta^{(i)}$, and $\theta_2 = n\,\omega_0^{(2)}\Delta^{(j)}$.

When the quantum computing system 10 is used in operation, the system 10 can be used to host a mathematical model of a real physical system to be controlled or provided with interactions. The mathematic model can include, for example, Monte Carlo simulations, for example of atoms in chemical interactions. Alternatively, the mathematical model can include a large number of rules linking variables, wherein the rules are colligated to generate one or more array system models into which input vectors (SV1) can be input to receive corresponding output vectors (SV2); in such use, there can be many millions of rules. Such mathematical models can be used to control real physical systems, for example multi-variate chemical processing apparatus, multi-variate agricultural systems such as greenhouses and so forth. Such greenhouses are beneficially modelled, where weather conditions affecting the greenhouses, as well as mass flows into and from the greenhouses have to be taken into account, in combination with a model of plant growth and associated fruit generation. In some cases, the quantum computing system 10 may generate the input vectors (SV1) by at least computing an expectation value of one or more of computed mean (e.g., a man of a probability distribution), variance and correlation using the disclosed methods described above.

Such rules enable, for example new poly-pharmaceutical medical agents and treatments to be devised (see published patent application WO2018086761 (A1) "*Control Apparatus and Method for processing data inputs in computing devices thereof*", the entire contents of which are incorporated by reference herein and made a part of this specification). Thus, embodiments of the present disclosure relate to systems for designing and manufacturing new types of medicines, wherein the quantum computer 40 provides quantum computations for such design and manufacture. Hosting the mathematic model enables the system 10 to compute how the real physical system will behave in various situations and to generate the output data $D_{out}$ accordingly. In other examples, the real physical system to be mathematically modelled is, at least in part, a financial system, wherein the output data $D_{out}$ provides analyses and recommendations (for example, trading signals) regarding how to interact with the real physical system, for example placing options, performing financial trading and so forth. Yet alternatively, the real physical system to be mathematically modelled is a chemical system, for example a chemical processing plant, a Carbon capture plant for sequestrating Carbon Dioxide from atmosphere, a new design of rechargeable battery and so forth. Yet alternatively, the real physical system to be mathematically modelled is an electrical power grid including a complex configuration of diverse energy sources such a renewable energy apparatus as well as diverse energy sinks such as industrial plant, energy storage apparatus that assist to stabilize operation of the electrical power grid, and so forth. In all the aforesaid practical uses of the system 10, there is a need to compute one or more of means (namely, numerical averages) of random variables, variances, covariances or correlations of sets of variables, often for extremely large data sets, for example up to Petabytes of data as aforementioned. Such requirements arise when processing DNA readout from sequences from DNA or RNA sequencing machines (for example, as manufactured by Qiagen Inc. or Illumina Inc.).

Referring next to FIG. 2A, there is shown a quantum circuit A, which is constructed from the aforesaid state preparation circuit P, (which encodes the probability distribution p of interest, and is taken as an input to the system 10), and some $R_y$ and Controlled-$R_y$ rotation gates, whose rotation angle is determined by the Fourier coefficients of the function $f(x)$. Thus, the quantum circuit A includes the state preparation circuit P, together with some $R_y$ and Controlled-$R_y$ rotation gates.

It will be appreciated that the quantum computer 40 is also susceptible to being configured to compute covariances and/or correlations between variables, for example measurands derived from a real physical system such as a sensor array, a camera, a PCR genetic DNA or RNA sequencing machine, a quantum sensor array, a radar system, and so forth.

When the method of the present disclosure is implemented to compute an expectation value of an arithmetic function (e.g., applied on samples selected from a probability distribution of interest) using the quantum computer 40, an error associated with the computed expectation value (e.g., a mean-squared error or MSE), may converge efficiently, a namely at a rate $q^{-2}$, where q represents a number of quantum queries to a circuit that prepares a quantum state encoding the probability distribution, and/or a number of classical samples selected from the probability distribution. As such, the method of the present disclosure uses the resources of the quantum computer 40 very efficiently when the quantum computing system 10 executes computations.

Figure 5:
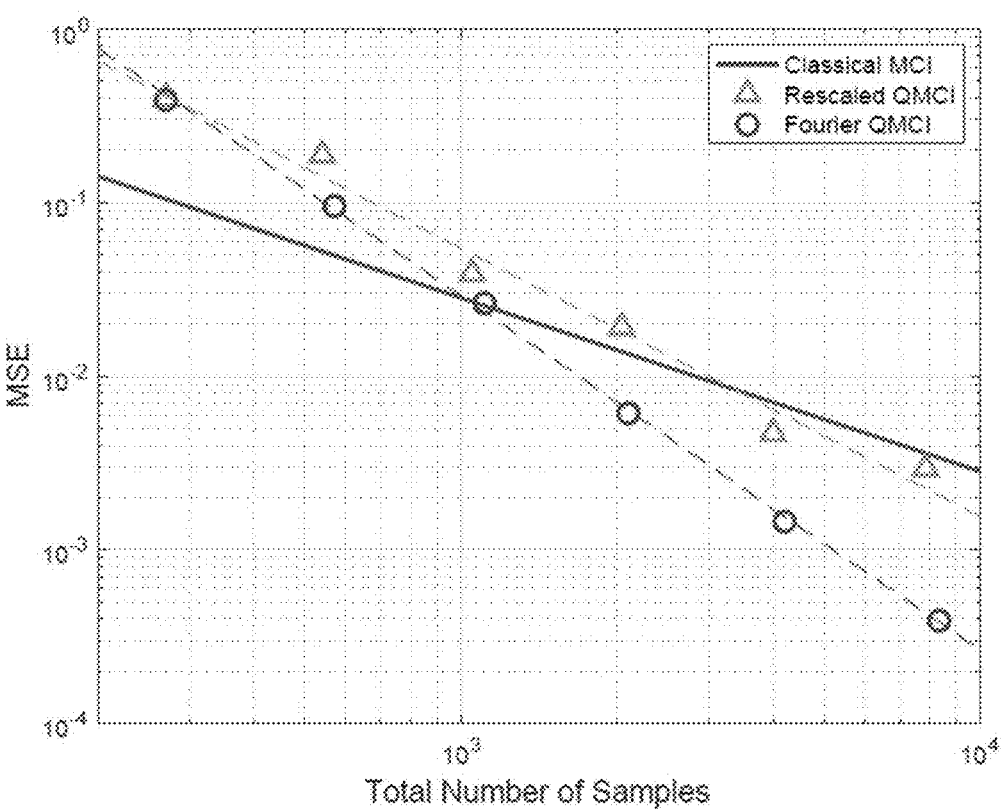
FIG. 5 is an illustration of mean-squared error (MSE) for computing a mean estimation plotted against total number of samples used for the computation, using: the method of this disclosure, Fourier Quantum Monte-Carlo Integration (QMCI), (data points represented by circles), using Rescaled Quantum Monte-Carlo Integration (Rescaled QMCI), (data points represented by triangles), and classical Monte-Carlo Integration (Classical QMCI), (solid line).

FIG. 5 shows mean-squared error (MSE) for computing a mean estimation (g(x)=x) plotted against a total number of samples used for the computation using: the method of this disclosure, Fourier Quantum Monte-Carlo Integration (QMCI), (data points represented by circles), using Rescaled Quantum Monte-Carlo Integration (Rescaled QMCI), (data points represented by triangles), and classical Monte-Carlo Integration (Classical QMCI), (solid line). The total number of samples can be the total number of samples selected from the corresponding probability distribution for computing the mean over the probability of distribution. As shown in FIG. 5 the convergence of the MSE can be faster than that of the other two methods, without performing any quantum arithmetic.

Example Quantum Computing System

In some implementations, a quantum computing system may be configured to compute or estimate the expectation value of a function g(x) of samples from a probability distribution. In some cases, the probability distribution may comprise a marginal distribution of a single dimension of a multivariate probability distribution function p (e.g., a multidimensional discrete probability distribution). In some examples, estimating the expectation value may comprise estimating the mean of the probability distribution implicitly defined by g(x) applied to samples, X from the $i^{th}$ dimension of p (e.g., represented as $p(x^{(i)})$), expressed as:

$$\mathbb{E}(g(X)) = \sum_{x^{(i)}} g(x^{(i)}) p(x^{(i)})$$

In some cases, the quantum computing system may comprise a classical computer and a quantum computer. The conventional classical computer may include a non-transitory memory configured to store specific computer-executable instructions and a hardware processor (e.g., an electronic processor) in communication with the non-transitory memory. In some examples, the quantum computer may include one or more qubits and one or more quantum gates configured to act on the one or more qubits. In some cases, at least a portion of quantum gates can include rotation gates. In some implementations, the quantum computer can be in communication with the classical computer via one or more communication links or via an interface. In some embodiments, the classical computer may execute instructions associated with a quantum compiling algorithm to compile output data generated by the classical computer to data and commands usable to configure the quantum computer and execute a quantum algorithm using one or more quantum circuits.

FIG. 7 is a flow diagram illustrating an example method that may be used by a quantum computing system (e.g., quantum computing system 10) to determine the expectation value of the function g(x) (e.g., the expectation value defined above). In some cases, the process 700 may be performed by a hardware processor of the quantum computing system (e.g., the hardware processor of the classical computer), and a controller of the quantum computer.

The process 700 begins at block 702 where the quantum computing system receives input data from a data source. In some cases, the data source can be a user interface of the quantum computing system (e.g., a user interface of the classical computer). In some cases, the data source may include a memory (e.g., a non-transitory memory of a computing system separate from the quantum computing system), or a sensor arrangement that is configured to generate and stream sensor data. In some examples, the data source can be a user providing input data via user interface of the quantum computing system or a user interface in communication (e.g., via wired or wireless data link) with the quantum computing system. In some examples, the input data may be stored in a memory of the quantum computing system.

In some cases, input data may include: data usable for using the quantum computer to generate results usable for calculating an expectation value of the function g(x).

In some cases, the input data may include an arithmetic function (e.g., the function g(x)) and data comprising or associated with a probability distribution p (e.g., a d-dimensional discrete probability distribution). In some cases, input data may include data associated with a dimension i of the d-dimensional discrete probability distribution that includes samples to which the function g(x) is applied. In some cases, the dimension i can be a dimension for which the marginal distribution is that of interest.

In various implementations, the input data may further include: the dimension i, one or more values usable for specifying p (e.g., a first point of distribution $x_l$ and a spacing interval $\Delta$), and a stopping criterion or data usable to determine a stopping criterion. In some cases, the stopping criterion may include a desired accuracy of the expectation value quantified by a threshold value of a mean square error (MSE) calculated for the expectation value. In some examples, the stopping criterion may comprise a maximum number of uses of a quantum circuit, a number of shots performed by the quantum computer, and/or an operation time of a quantum circuit.

In some cases, input data may include a symbolic form of circuit P (e.g., a quantum circuit) or data usable to construct the circuit P where circuit P can prepare a quantum state |p> associated with the probability distribution p. In some examples, the quantum state |p> can be a quantum state into which the probability distribution p is encoded.

At block 704, the quantum computing system may use the input data to generate configuration data. The configuration data may include data usable to configure the quantum computer such that by executing a quantum algorithm using the quantum computer, the quantum computer generates results usable for estimating or computing the expectation value of g(x). In some cases, the configuration data may be used to prepare quantum states (e.g., prepare qubits having initial quantum states), construct quantum circuits, and control the constructed quantum circuits that operate on the prepared quantum states. In some cases, the constructed quantum circuits may operate on the prepared quantum states In some cases, the configuration data may include data associated with the probability distribution p. For example, the quantum computing system may process a portion of the input data to generate the symbolic form of a quantum circuit P that can prepare a quantum state |p> associated with a probability distribution (e.g., the probability distribution p included in the input data).

In some cases, a portion of the configuration data may be included in the input data.

In various implementations, configuration data may include symbolic form of one or more quantum circuits and a number of uses for each quantum circuit. In some examples, the quantum computing system may execute computer-executable instructions to determine the symbolic form of one or more quantum circuits and a number of uses for each quantum circuit using the process shown within the block 704. For example, at step 704*a* the quantum computing system may construct a smooth periodic function $f(x)$ from the function $g(x)$. At block 704*b*, the quantum computing system calculates the Fourier components of the function $f(x)$. In some cases, a number of the Fourier components calculated may be restricted by a threshold value. The threshold value can be a maximum number of Fourier components. At block 704*c*, the quantum computing system constructs a symbolic form of a quantum circuit 4 based on the Fourier component of $g(x)$ calculated at block 704*b*. In some cases, the quantum computing system may generate data usable (e.g., by the quantum computer) for constructing a quantum circuit A for each Fourier component. For example, for each Fourier component, the quantum computing system may generate a specific numerical value of the symbolic form of A. In some cases, the numerical value of the symbolic form of A for a Fourier component may comprise parametrized gates usable for constructing a quantum circuit for the corresponding Fourier component.

In some cases, the data usable for constructing the quantum circuit A for each Fourier component may comprise a circuit of form $G=Q^m A$ where m may differ for each Fourier component. In some cases, for each Fourier component, the circuits of the form G may be passed to the quantum computer as part of the configuration data along with a number of shots associated with the Fourier component.

In some cases, a symbolic form of a quantum circuit A may be constructed and/or the values of the symbolic form of A for a Fourier component may be calculated based at least in part on the circuit P or the symbolic form of the circuit P, dimension i, the first point of distribution $x_i$ and the spacing interval $\Delta$. In some cases, a symbolic form of a quantum circuit A may be constructed and/or the values of the symbolic form of A for a Fourier component may be calculated based at least in part on the number of qubits (e.g., number of qubits in a register) for each dimension of the multidimensional probability distribution over which the expectation value of the function $g(x)$ is desired and estimated.

In some examples, the quantum computing system may constructs symbolic forms of a quantum circuit A for a restricted number of Fourier component of $g(x)$. In some cases, the number of Fourier components for which a symbolic form of a quantum circuit A is constructed may be restricted by a threshold value. The threshold value can be a maximum number of Fourier components.

In some examples, the quantum computing system may determine the maximum number of Fourier components based at least in part on a desired value of an error function (e.g., a mean square error) an/or the stopping criterion.

At block 704*d*, the quantum computing system may determine a number of uses of A for each Fourier component. In some cases, the processor may determine the number of uses of A for a Fourier component based at least in part on the stopping criterion. In some cases, the processor may determine the number of uses of A for a Fourier component based at least in part on a desired value of an error function (e.g., a mean square error). In some cases, the stopping criterion may include a maximum number of uses of a quantum circuit determined for a Fourier.

In some examples, the number of uses of A may comprise the number of shots performed by the quantum computer for determining the expectation value of a function $g(x)$. In some examples, the number of uses of A may be determined based at least in part on the maximum number Fourier components for which a symbolic form of A has been generated. The number of uses of A may be determined based at least in part on a desired value of an error function (e.g., a mean square error).

In some cases, the configuration data may include a portion of the input data.

At block 706 the quantum computer may use a quantum compiler to compile the configuration data generated at block 704 to generate compiled configuration data usable to configure the quantum computer for computing the expectation value of $g(x)$.

At block 708 the quantum computer may use the compiled configuration data to configure the quantum computer for determining the expectation value of a function $g(x)$. In some cases, the quantum computer may have a controller that receives the configuration data and configures the quantum computer by preparing one or more quantum states and one or more quantum circuits and controls the execution of quantum algorithms by the quantum computer. In some cases, the configuration of the quantum computer may include constructing and preparing a quantum circuit associated with A for a Fourier component. In some examples, the quantum circuit associated with A for a Fourier component may comprise a phase rotation quantum gate. In some cases, preparing the quantum state may include |p> (into which the probability distribution p is encoded) using circuit P. In some examples, a quantum circuit may include at least one rotation gate representing a Fourier component calculated at block 708. In some examples, a quantum circuit may include the quantum circuit A.

At block 710, the quantum computer executes a quantum algorithm on the quantum computer configured at block 708 for each Fourier component. In some cases, the quantum algorithm may include an amplitude estimation (QAE) algorithm. Execution of the quantum algorithm may include processing and/or transforming the state |p>prepared at block 708 using the quantum circuits prepared at block 708 and measuring the resulting quantum states. In some cases the state |p> may include a plurality of components. In some such cases, the quantum circuits may operate on the plurality of the components and the outcome of each operation may be measured to generate a plurality of quantum measurement results. In some cases, each quantum circuit (e.g., each rotation gate) may operate on a component of |p> and the resulting state may be measured.

At block 712, the quantum computer may use the results of the measurements (e.g., the quantum measurements) performed to estimate the expectation value of $g(x)$.

In some cases, the stopping criterion may include an upper bound for the time interval during which the results are generated (e.g., from the time the quantum computing system starts executing the quantum algorithm).

At block 714, the quantum computer may transmit output data comprising estimated expectation value of g(x) to a data communication interface, a user interface or another computing system.

In some examples, the processes described with respect to blocks 702, 704 (including 704a-704d), 706, 712, 714 may be performed by a processor of the classical computer of the quantum computing system. In some examples, the processes described with respect to blocks 708 and 710 may be performed by quantum computer (e.g., by a controller of the quantum computer). In some cases, the controller of the quantum computer may include a second hardware processor and a second non-transitory storing computer-executable instructions for processing configuration. In some cases, the controller of the quantum computer may use the computer-executable instructions to process the configuration data (e.g., received from the classical computer), to prepare quantum states, and quantum circuits using the qubits and quantum gates include in the quantum computer. In some implementation, the qubits may comprise photons and having photonic states and the quantum gates may comprise photonic components configured to control and manipulate the photonic states. In some examples, the processes described with respect to block 708 may be performed by the classical computer.

In various implementations, different processes described with respect to different blocks of the process 700, or processes within a block may be performed by the hardware processor of the classical computer, a processor of the quantum computing system separate from the processor of the classical computer, or a processor of a controller of the quantum computing system. In some cases, the user interface from which input data is received and/or the output data is presented or provided to the user can be an external user interface in communication with the quantum computing system.

In some cases, at least a portion of the process 700 can be an adaptive process. For example, after estimating the expectation value of g(x) at block 712, the quantum computing system may make a decision whether to move to block 714 or return to block 704c and perform another iteration of the steps described with respect to blocks 704c. 704d, 706, 708, 710, and 712. In some cases, where the process 700 is adaptive, at block 712 the quantum computing system may make a decision whether to move to block 714 or return to block 704a or 704b and perform another iteration of the steps described with respect to the blocks 704a, 704b, 704c, 704d, 706, 708, 710, and 712 (or blocks 704b, 704c, 704d, 706, 708, 710). If the quantum computer decides to repeat the processes associated with a subset of blocks, these processes may be repeated until the resulting at block 712 the quantum computing systems decides to proceed to block 714 based at least in part on the last estimated expectation value. In some examples, the quantum computing system may make the decision by executing instructions pertaining an evaluation of an estimated expectation value generated in the first or a previous iteration, e.g., using the classical computer. In some cases, data (e.g., quantum data) generated in an iteration may be used as input to the next iteration of the process.

Figure 8:
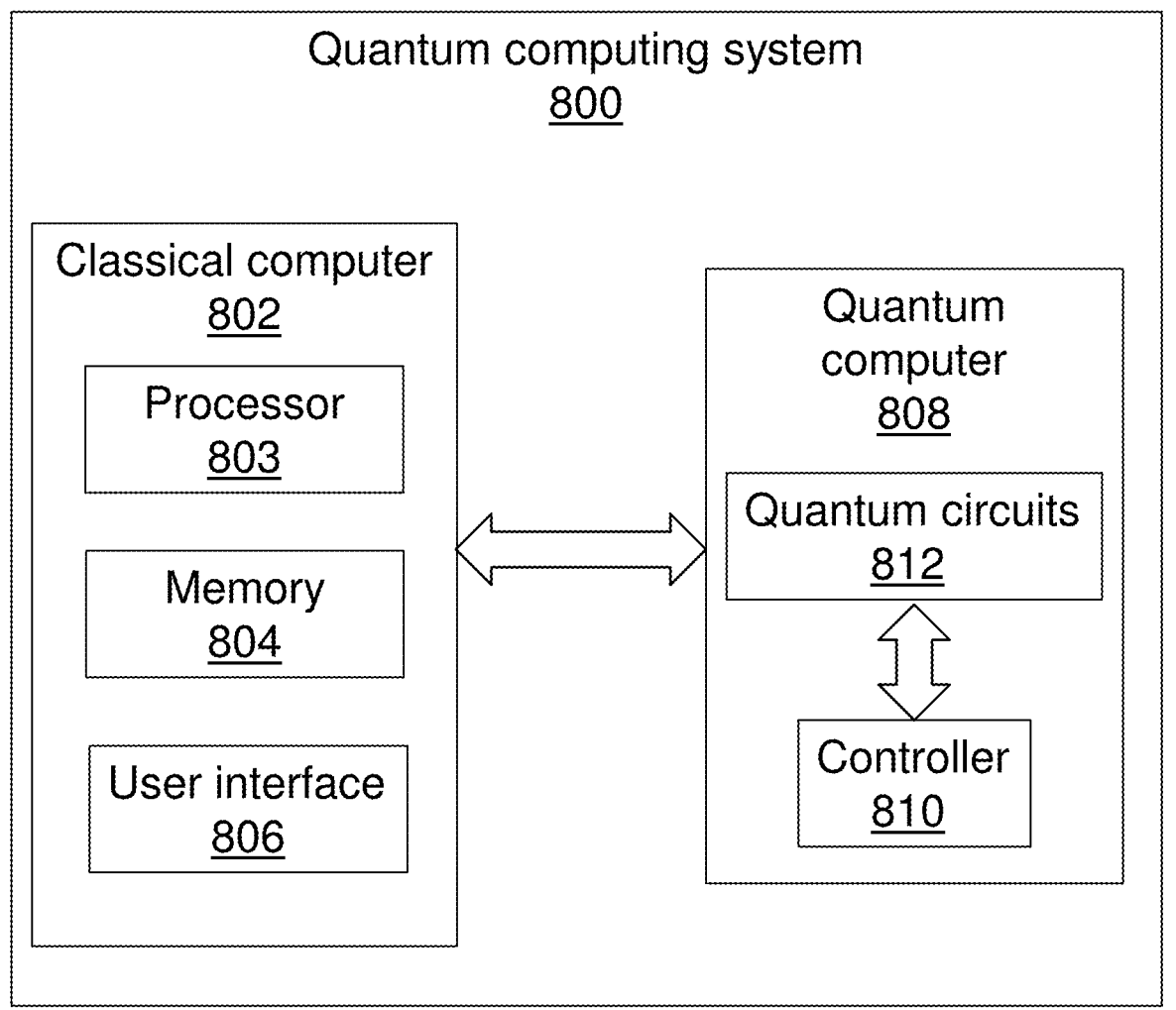
FIG. 8 is a block diagram illustrating an example quantum computing system.

FIG. 8. is block diagram illustrate an example quantum computing system 800 that includes a classical computer 802 combined with a quantum computer 808. In some cases, the classical computer 802 and the quantum computer 808, may be included or integrated in the same housing. The classical computer 802 may include a user interface 806, first hardware processor 803 and a first non-transitory memory 804. The quantum computer 808 may have a controller 810 that includes a second hardware processor and a second non-transitory memory (not shown). In some cases, the classical computer 802 may execute computer-executable instructions stored in the first non-transitory memory 804 to: control the operation of the classical computer 802, the flow of data between the classical computer 802 and the quantum computer 808, and control, at least in part, the operation of the classical computer 802. In some cases, the classical computer may send data and commands to the controller 810 and the controller 810 may configure one or more quantum circuits 812 according to the data and commands received from the classical computer 802.

Figure 9:
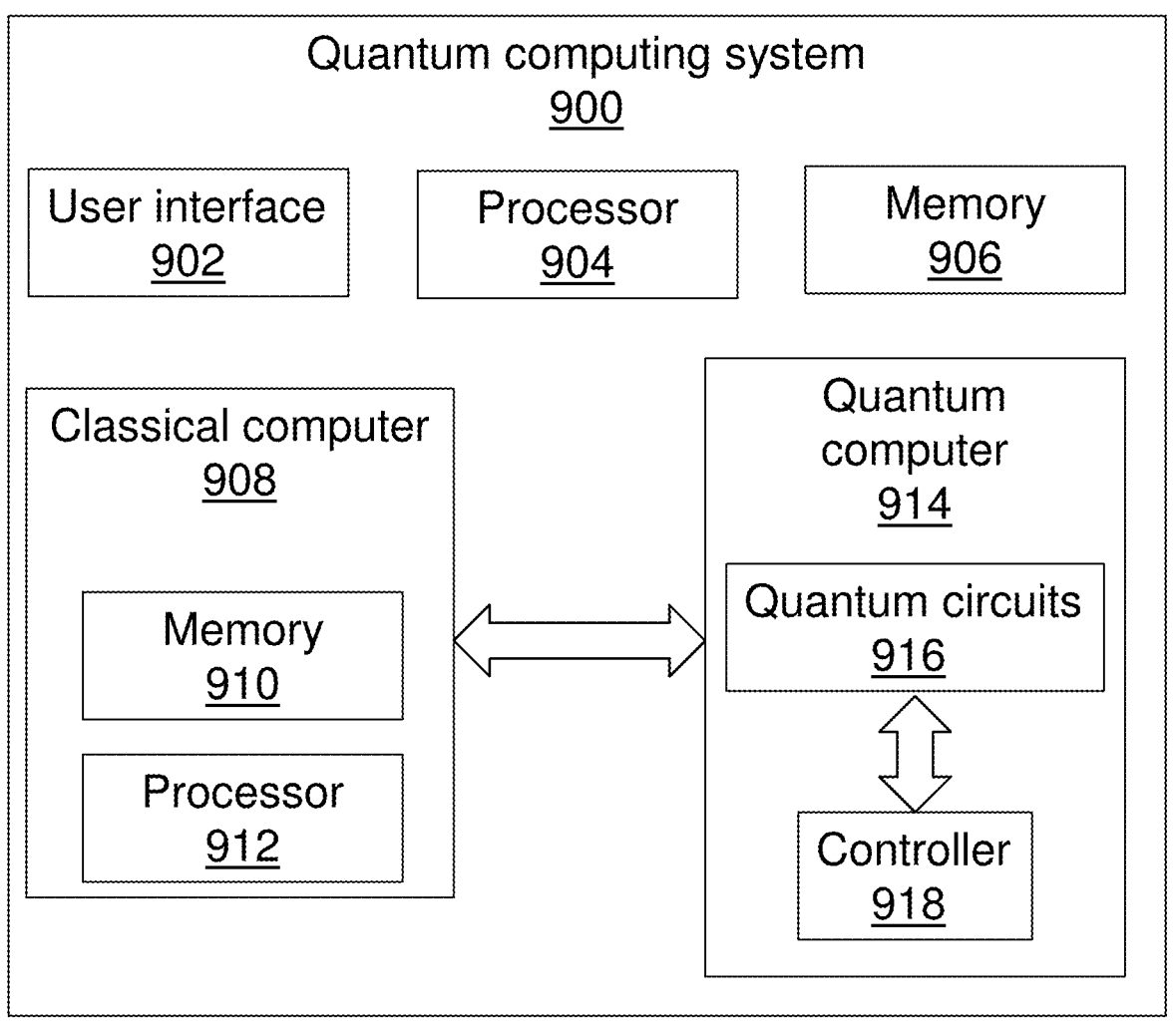
FIG. 9 is a block diagram illustrating another example quantum computing system.

FIG. 9. is block diagram illustrate an example quantum computing system 900 that includes a user interface 902, a first hardware processor 904, and a first non-transitory memory 906, a classical computer 908, and a quantum computer 914. The classical computer may include a second hardware processor 912 and a second non-transitory memory 910. The quantum computer 914 may have a controller that includes a third hardware processor and a third non-transitory memory (not shown). In some cases, the quantum computing may execute computer-executable instructions stored in the first non-transitory memory 906 to: control the operation of the classical computer 908 and the quantum computer 914, flow of data between the classical computer 908 and the quantum computer 914, flow of data between the user interface 902 and the memory 906, flow of data between the classical computer 908, and the quantum computer 914. In some implementations the classical computer 908 may execute computer-executable instructions stored in the second non-transitory memory 910 to: receive input data from the user interface 902, and generate configuration data usable for configuring the quantum computer 914. In some such implementations, the controller 918 may execute computer-executable instructions stored in the third non-transitory memory to: receive configuration data from the classical computer 908, configure the quantum circuits 916 according to configuration data, and execute a quantum algorithm using the configured quantum circuits 916. In various implementations, the controller 918 may receive the quantum algorithm and/or commands associated with the quantum algorithm from the user interface memory 906, memory 910, processor 912, or processor 904.

Figure 10:
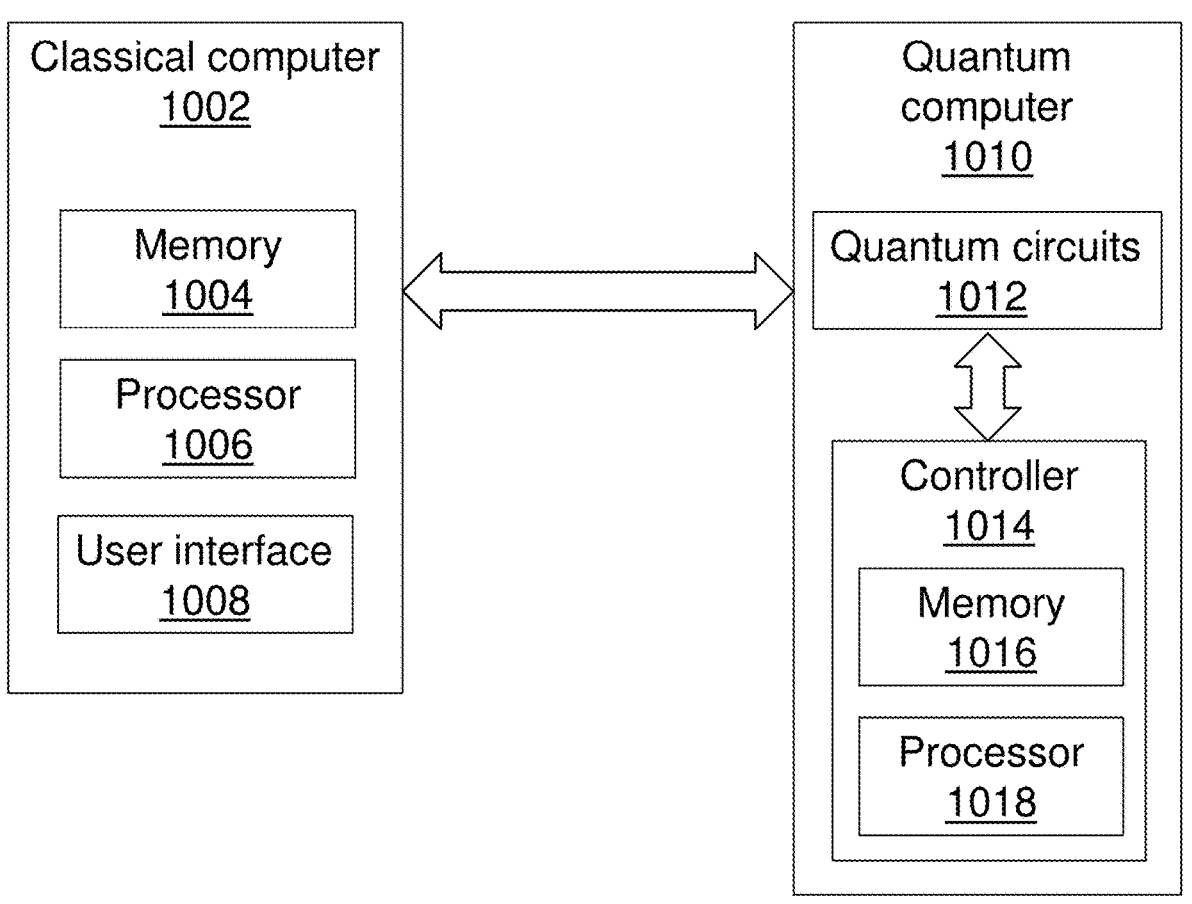
FIG. 10 is a block diagram illustrating an example distributed quantum computing system.

FIG. 10. is a block diagram illustrate an example distributed quantum computing system 1000 that includes a classical computer 1002 and a quantum computer 1010 where the classical computer 1002 and the quantum computer 1010 are separate systems. In some cases, the classical computer 1002 and the quantum computer 1010 can be in communication via a data link. The data link can be a wired or wireless data link. The wireless data link may comprise a local area network (LAN), a Wi-Fi connection, or a wide area network (WLAN).

The classical computer may include a first hardware processor 1006, a first non-transitory memory 1004, and a user interface 1008. The quantum computer 1010 may include a controller 1014 that includes a second hardware processor 1018 and a second non-transitory memory 1016. The Controller 1014 can be configured to construct and/or configure quantum circuits 1012 bases at least in part on data (e.g., configuration data) received from the classical computer 1002 via the communication link. n some implementations the classical computer 1002 may execute computer-executable instructions stored in the first non-transitory memory 1004 to: receive input data from the user interface 1008, and generate configuration data usable for configuring the quantum computer 1010 (e.g., by the controller 1014 of the quantum computer 1010). In some such implementations, the controller 1014 may execute computer-executable instructions stored in the second non-transitory memory 1016 to: receive configuration data from the classical computer 1002, configure the quantum circuits 1012 according to configuration data, and execute a quantum algorithm using the configured quantum circuits 1012. In various implementations, the controller 1014 may receive the quantum algorithm and/or commands associated with the quantum algorithm from the classical computer 1002. In some examples, at least a portion of the quantum algorithms may be stored in the memory 1016.

In some cases, the quantum computer can be a conventional quantum computer based on any quantum computing technology (e.g., trapped ions, photons, superconducting circuits, and the like).

In some cases, a quantum computer (e.g., the quantum computer 808, 914, or 1010) may comprise a plurality of quantum computers interconnected, for example, using quantum communication channels and/or shared entanglement.

Example Embodiments

Some additional nonlimiting examples of embodiments discussed above are provided below. These should not be read as limiting the breadth of the disclosure in any way.

Example 1: A quantum computing system configured to compute a value of an arithmetic function using samples from a probability distribution: the quantum computing system comprising: a classical computer; a quantum computer comprising one or more qubits and one or more quantum gates configured to act on the one or more qubits, wherein at least a portion of quantum gates comprise rotation gates; wherein the quantum computer is in communication with the classical computer; a non-transitory memory configured to store specific computer-executable instructions; and a hardware processor in communication with the non-transitory memory, wherein the hardware processor is configured to execute the specific computer-executable instructions to at least: receive input data, wherein the input data comprises at least the arithmetic function, transform the arithmetic function into a series of Fourier components; generate configuration data based at least in part the Fourier components and the input data; configure the quantum computer based at least in part on the configuration data to prepare one or more quantum circuits representing the Fourier components, wherein the one or more quantum circuits comprise the rotation gates; execute a quantum algorithm using the quantum circuits to generate outputs comprising quantum measurement results; and generate output data comprising the value of an arithmetic function using the quantum measurement results.

Example 2: The quantum computing system of example 1, wherein the hardware processor is further configured to execute the specific computer-executable instructions to generate the configuration data by determining a symbolic form of a quantum circuit A and a numerical value of the symbolic form of the quantum circuit A for each Fourier component.

Example 3: The quantum computing system of example 2, wherein the configuration data comprises a number of uses of A for each Fourier component.

Example 4: The quantum computing system of example 3, wherein the hardware processor is further configured to execute the specific computer-executable instructions to determine the number of uses of A based at least in part on a desired value of an error function.

Example 5: The quantum computing system of example 3, wherein the hardware processor is further configured to execute the specific computer-executable instructions to determine the number of uses of A based at least in part on the input data.

Example 6: The quantum computing system of example 1, wherein the hardware processor is further configured to execute the specific computer-executable instructions to generate the configuration data by determining a symbolic form of a quantum circuit P.

Example 7: The quantum computing system of example 6, wherein the hardware processor is further configured to execute the specific computer-executable instructions to configure the quantum computer by further preparing a quantum state (p>associated with the probability distribution using the quantum circuit P.

Example 8: The quantum computing system of example 1, wherein the input data further comprises the probability distribution.

Example 9: The quantum computing system of example 1, wherein the quantum algorithm comprises a quantum amplitude estimation algorithm.

Example 10: The quantum computing system of example 1, wherein the input data comprises a stopping criterion or data usable to determine a stopping criterion.

Example 11: The quantum computing system of example 10, wherein the hardware processor is further configured to execute the specific computer-executable instructions to determine a maximum number of Fourier components based at least in part on the stopping criterion or the data usable to determine a stopping criterion.

Example 12: The quantum computing system of example 11, wherein a number of Fourier components is equal or less than the maximum number of Fourier components.

Example 13: The quantum computing system of example 1, wherein the arithmetic function is a continuous function that has a continuous first derivative over support of the probability distribution function.

Example 14: The quantum computing system of example 1, wherein the probability distribution comprises samples from a dimension of a multidimensional discrete probability distribution.

Example 15: The quantum computing system of example 14, wherein the probability distribution comprises a marginal probability distribution associated with the multidimensional discrete probability distribution.

Example 16: The quantum computing system of example 1, wherein the value of the arithmetic function is an expectation value of the arithmetic function.

Example 17: The quantum computing system of example 16, wherein expectation value of the arithmetic function is a mean the probability distribution.

Example 18: The quantum computing system of example 1, wherein the hardware processor is a hardware processor of the classical computer.

Example 19: The quantum computing system of example 1, the classical computer is a classical computer in a remote computing system, Example 20: The quantum computing system of example 19, wherein a controller of the quantum computer is configured to receive compiled configuration data generated by the classical computer and to configure the quantum computer based at least in part on the compiled configuration data.

Example 21: The quantum computing system of example 19, the classical computer is in communication with the quantum computer via a wireless communication link.

Example 22: A method for operating a quantum computing system configured to compute a value of an arithmetic function using samples from a probability distribution: the quantum computing system comprising: a classical computer; a quantum computer comprising one or more qubits and one or more quantum gates configured to act on the one or more qubits, wherein at least a portion of quantum gates comprise rotation gates; wherein the quantum computer is in communication with the classical computer; the method comprising: by a hardware processor of the quantum computing system executing instructions stored on non-transitory memory connected to the hardware processor: receiving input data, wherein the input data comprises at least the arithmetic function, transforming the arithmetic function into a series of Fourier components; generating configuration data based at least in part the Fourier components and the input data; configuring the quantum computer based at least in part on the configuration data to prepare one or more quantum circuits representing the Fourier components, wherein the one or more quantum circuits comprise the rotation gates; executing a quantum algorithm using the quantum circuits to generate outputs comprising quantum measurement results; and generating output data comprising the value of an arithmetic function using the quantum measurement results.

Example 23: The method of example 22, wherein generating the configuration data comprises determining a symbolic form of a quantum circuit A and determining a numerical value of the symbolic form of the quantum circuit A for each Fourier component.

Example 24: The method of example 23, wherein the configuration data comprises a number of uses of A for each Fourier component.

Example 25: The method of example 24, wherein determining the number of uses of A comprises determining the number of uses of A based at least in part on a desired value of an error function.

Example 26: The method of example 24, wherein determining the number of uses of A comprises determining the number of uses of A based at least in part on the input data.

Example 27: The method of example 22, wherein the generating the configuration data comprises determining a symbolic form of a quantum circuit P.

Example 28: The method of example 27, wherein configuring the quantum computer comprises preparing a quantum state $|p>$ associated with the probability distribution using the quantum circuit P.

Example 29: The method of example 23, wherein the input data further comprises the probability distribution.

Example 30: The method of example 22, wherein the quantum algorithm comprises a quantum amplitude estimation algorithm.

Example 31: The method of example 22, wherein the input data comprises a stopping criterion or data usable to determine a stopping criterion.

Example 32: The method of example 31, further comprising determining a maximum number of Fourier components based at least in part on the stopping criterion or the data usable to determine a stopping criterion.

Example 33: The method of example 32, wherein a number of Fourier components is equal or less than the maximum number of Fourier components.

Example 34: The method of example 22, wherein the arithmetic function is a continuous function that has a continuous first derivative over support of the probability distribution function.

Example 35: The method of example 22, wherein the probability distribution comprises samples from a dimension of a multidimensional discrete probability distribution.

Example 36: The method of example 35, wherein the probability distribution comprises a marginal probability distribution associated with the multidimensional discrete probability distribution.

Example 37: The method of example 22, wherein the value of the arithmetic function is an expectation value of the arithmetic function.

Example 38: The method of example 37, wherein expectation value of the arithmetic function is a mean the probability distribution.

Example 39: The method of example 22, wherein the hardware processor is a hardware processor of the classical computer.

Example 40: The method of example 22, the classical computer is a classical computer in a remote computing system, Example 41: The method of example 40, wherein a controller of the quantum computer is configured to receive compiled configuration data generated by the classical computer and configure the quantum computer based at least in part on the compiled configuration data.

Example 42: The method of example 40, the classical computer is in communication with the quantum computer via a wireless communication link.

Example 43: A machine-readable data storage medium comprising specific instructions that are executable on data processing hardware, wherein the instructions, when executed by the data processing hardware, implement the method of example 22.

Terminology

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural; as an example, "at least one of" indicates "one of" in an example, and "a plurality of in another example; moreover, "one or more" is to be construed in a likewise manner.

The phrases "in an embodiment", "according to an embodiment" and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The term "computer" or "computing-based device" is used herein to refer to any device with processing capability such that it executes instructions. Those skilled in the art will realize that such processing capabilities are incorporated into many different devices and therefore the terms "computer" and "computing-based device" each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible, non-transitory storage medium, e.g., in the form of a computer program comprising computer program code adapted to perform the operations of one or more of the methods described herein when the program is run on a computer and where the computer program may be embodied on a non-transitory computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. No single feature or group of features is necessary or indispensable to every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, blocks, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A; B; C; A and B; A and C; B and C; and A, B, and C. Conjunctive language such as the phrase "at least one of X, Y, and Z," unless specifically stated otherwise, is otherwise understood with the context as used in general to convey that an item, term, etc. may be at least one of X, Y, or Z. Thus, such conjunctive language is not generally intended to imply that certain embodiments require at least one of X, at least one of Y, and at least one of Z to each be present.

The operations of the methods described herein may be carried out in any suitable order, or simultaneously where appropriate. Additionally, individual blocks may be deleted from, combined with other blocks, or rearranged in any of the methods without departing from the scope of the subject matter described herein. Aspects of any of the examples described above may be combined with aspects of any of the other examples described to form further examples without losing the effect sought.

It will be understood that the above description is given by way of example only and that various modifications may be made by those skilled in the art. The above specification, examples, and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

APPENDIX: QUANTUM COMPUTATION OF MEANS, VARIANCES AND CORRELATIONS

A Method for Using Quantum Computing to Numerically Estimate the Mean of Some Function of Random Variable Sample from a Multivariate Probability Distribution Encoded in a Quantum State 1. Introduction The quantum advantage in Monte-Carlo is an advantage in query complexity: in quantum Monte-Carlo (QMC), also known as quantum Monte-Carlo integration (QMCI), fewer queries to a circuit that prepares a quantum state encoding a probability distribution of interest will be required to obtain a certain estimation accuracy than the number of samples from the distribution in classic Monte-Carlo. For simplicity, in the description below, there is used "q" to denote both the number of quantum queries and number of classic samples. Classically, the mean-squared error (MSE) is proportional to $q^{-1}$ whereas quantumly MSE proportional to $q^{-2}$ can be achieved by using quantum amplitude estimation (QAE).

However, this requires arithmetic operations (namely square root and arccos) to be performed on the quantum computer 40, and whilst those operations do not pose a problem in terms of the asymptotic performance, they are likely to be prohibitively computationally costly in the noisy interme-diate-term quantum (NISQ) era. There is an analogy with the need to dispense with the quantum Fourier transform (QFT) here: whilst not being a problem asymptotically, the QFT is not NISQ-friendly, hence the rise of amplitude estimation without phase estimation [Ref 1] and other related proposals [Ref 2, 3].

The foremost proposal to work around the need for quantum arithmetic is showcased in *Option Pricing using Quantum Computers* [Ref 4] in which a technique proposed by Woerner and Egger [Ref 5] is used. Specifically, the technique rescales the probability distribution such that each point of probability mass corresponds to a rotation close to $\pi/4$ radians, thus achieving an approximate linearization in this way. However, this method has an adverse effect on the convergence-now the MSE only converges as $\mathcal{O}$ ($q^{-4/3}$) [note that $\mathcal{O}$ denotes "an order of"]: such a convergence is still better than classical, but much worse than an ideal quantum case. Worse still, it can be seen that this really represents a false economy: the requirement of quantum arithmetic has been removed to reduce the circuit depth, but this comes at a cost of reduced convergence rate, and so correspondingly deeper circuits will be required to achieve the specified estimation accuracy.

In this Appendix, there is proposed a method that repre-sents the best of both worlds: there is no quantum arithmetic required, but the MSE convergence is still proportional to $q^{-2}$, as in the ideal quantum case. These results are summa-rized in Table 1. Table 1 includes classical Monte-Carlo computation for comparison, but it should be noted that there are classical alternatives, for example quadrature and quasi Monte-Carlo methods. Ostensibly, these appear to have favourable performance (achieving MSE convergence proportional to $q^{-2}$); however, they suffer the curse of dimensionality: the complexity grows exponentially with the number of dimensions. Hence it is noteworthy that the proposed method of the present disclosure applies to multi-variate probability distributions as, for a sufficiently large number of dimensions, classical Monte-Carlo will be the most appropriate classical algorithm to benchmark against.

TABLE 1

Comparison of MSE convergence (in terms of number
of queries/samples, q) for different Monte-Carlo
estimation methods, where X denotes samples from p(x).
For the proposed method of the present disclosure, it is necessary
that g is a continuous function and has a continuous first derivative.

| Method | Computes | MSE | Comments |
|---|---|---|---|
| Classical Monte-Carlo | E (g(X)) | $\mathcal{O}$ ($q^{-1}$) | — |
| Quantum Monte-Carlo | E (g(X)) | $\mathcal{O}$ ($q^{-2}$) | Quantum arithmetic required |
| Rescales QMC (ref 4, 5] | E (X) | $\mathcal{O}$ ($q^{-4/3}$) | No quantum arithmetic |
| Method proposed here | E (g(X)) | $\mathcal{O}$ ($q^{-2}$) | No quantum arithmetic |

The method that is propose in the present disclosure can be used to estimate not only the mean of the probability distribution, but also the mean (that of) the random process defined by applying any smooth (continuous in value and first derivative) function to samples from the probability distribution. This immediately suggests a way in which useful quantum advantage may be realised in QMC, in spite of results suggesting that typical methods to prepare quan-tum states may lead to false promises of quantum advantage [Ref 6]. In the present disclosure, it is therefore appreciated that quantum advantage can be realised using the proposed method if:

(a) there is some probability distribution that can be exactly prepared as a quantum state in shallow depth; and (b) there is applied a function to the random variables that are sampled from a distribution whose mean cannot be analytically evaluated.

This is a clear and useful distinction over, for example, the method proposed in Ref 4 where the distribution of interest must be directly encoded into the quantum state, hence possibly incurring a circuit depth that, at best, is NISQ infeasible (especially once the slower convergence is also taken into account) and, at worst, negates the quantum advantage altogether (namely, for reasons along the lines given in Ref 6). Results of the present disclosure hold, indeed are perhaps even more pertinent, if the probability distribution is prepared from some empirical data rather than an analytically defined distribution. It is, however, important to note one significant caveat: the proposed method of the present disclosure extends the function applied to the ran-dom variables as some periodic function and finds the Fourier series components thereof, and so it follows that if the integrals required to find the Fourier series coefficients cannot be performed analytically then there could once again be a false economy (as in Ref 6) is numerical inte-gration is resorted to. Nevertheless, this caveat is largely ameliorated because:

(a) it is expected that many functions of interest will have analytically computable Fourier coefficients; and (b) for commonly used functions where numerical inte-gration is required, it will be possible to pre-compute the coefficients to very high precision and then store.

In the present disclosure, the method is also generalised to finding the expectations of products of random variables (that is, random variables that are in general correlated and this correspond to different dimensions of a multivariate probability distribution), and to give covariance estimation as a key example of this.

Related Work

The method proposed in the present patent disclosure is novel relative to known technical art. Moreover, the pro-posed method calls a quantum amplitude estimation (QAE) algorithm as a subroutine, wherein the QAE algorithm is optionally any QAE algorithm, for example the original QAE proposal of Brassard et al. (Ref 7), a NISQ-favourable method (for example, Ref 1 to 3, 8) or even the classical-quantum interpolation algorithm patented by QC Ware (Ref 9). In a similar manner, the proposed method of the present disclosure takes some state-preparation circuit as an input: in particular, the circuit prepares a state that encodes a prob-ability distribution. The Grover-Rudolph method (Ref 10) is often cited as the definitive way to do this, and may well be appropriate for preparing simple distributions (which a function is applied to the random samples therefrom). Alter-native methods of state preparation include the Vazquez-Woerner method (Ref 11) and qGANs (Ref 12, 13).

Monte-Carlo techniques are ubiquitous in science, engi-neering and operations research; however, it is predomi-nantly an interest from quantum finance that has driven research of quantum Monte-Carlo methods to date (Ref 5, 14 to 21). It is also to be noted that, whilst embodiments of the present disclosure are concerned only with Monte-Carlo integration here (namely, Monte-Carlo estimation in its simplest form), Montanaro has shown that there is typically a quantum speed-up for more advanced forms of Monte-Carlo including Markov Chain Monte-Carlo (Ref 22).

2. Overview of Proposed Method

Suppose there is available a d-dimensional discrete probability distribution p. Points of non-zero probability mass are spaced at constant intervals and for simplicity; the points along each axis are conveniently allowed to be a power of 2, say $2^{Nj}$ for the $j^{th}$ dimension (the ability to zero-pad means there is no loss of generality in this assumption)[1]. The probability distribution is encoded in a quantum state $|p\rangle$, (which is taken as an input to the proposed method) of the form:

$$|p\rangle = \sum_{x^{(1)}\in\{0,1\}^{n_1}} \sum_{x^{(2)}\in\{0,1\}^{n_2}} \cdots \sum_{x^{(d)}\in\{0,1\}^{n_d}} \sqrt{p(x^{(1)}, x^{(2)}, \ldots x^{(d)})} |x^{(1)}x^{(2)} \ldots x^{(d)}\rangle \quad \text{Eq. 1}$$

where p is the discrete probability distribution; note that this is the natural multi-dimensional generalisation of standard univariate amplitude encoding. The proposed method then takes the following inputs:

A circuit, P, that prepares $|p$, namely P is such that $|p\rangle = P|0\rangle$.

A dimension for which the marginal distribution is that of interest; let this be the $i^{th}$ dimension.

Specification of the support of $p(x^{(i)})$. This is given as the value that the first point of the distribution corresponds to, $x_i$ and the spacing interval, $\Delta$. It is also helpful to define the maximum value of the support of the distribution $x_u = x_i + (2^{Ni}-1)\Delta$.

A function g(x), which is continuous and has continuous first derivative over the support of $p(x^{(i)})$.

A stopping criterion.

and returns an estimate of the mean of the probability distribution implicitly defined by g(x) applied to samples, X, from $p(x^{(i)})$ (where $p(x^{(i)})$ is the marginal probability), that is an estimate of:

$$\mathbb{E}(g(X)) = \sum_{x^{(i)}} g(x^{(i)}) p(x^{(i)}) \quad \text{Eq. 2}$$

The stopping criterion requires a little further explanation: the mathematics that underpins the proposed method amounts to a proof that the convergence of the way of estimating the mean is asymptotically efficient, and as such says little about any finite duration execution of the algorithm. There are manifold stopping criteria one could think of using; however, a natural stopping criterion is to give a maximum number of uses of the circuit P. This is sometimes referred to as a number of "queries" to P.

The mean estimation method calls some QAE algorithm as a subroutine.

Definition 1. A QAE algorithm takes as an input a circuit A such that $A|0\rangle = \cos\theta_\alpha |\Psi_0\rangle |0\rangle + \sin\theta_\alpha |\Psi_1\rangle |1\rangle$ and returns an estimate of $s = \sin^2\theta_\alpha^3$. The allowed number of uses, denoted "q", of the circuit A is given as an input to the QAE algorithm, and this must be at least equal to some minimum value, $q_{min}$.

From this definition, it is feasible to write any QAE algorithm as a function in pseudocode from:

$$\hat{s} = QAE(A, q) \quad \text{Eq. 3}$$

where $\hat{s}$ expresses the fact that this is an estimate of the actual value, b. It is also useful where to formally define the MSE, $\hat{\epsilon}^2$:

$$\hat{\epsilon}^2 = \mathbb{E}((\hat{s} - s)^2) \quad \text{Eq. 4}$$

The proposed method assumes ghat the convergence rate of the MSE with the number of uses of A is known, that is (neglecting lower order terms), we know the constant $\lambda$ such that:

$$\hat{\epsilon}^2(q) \propto q^{-\lambda} \quad \text{Eq. 5}$$

For Classical Monte-Carlo modelling, it pertains that $\lambda=1$, whereas typical QAE algorithms have $\lambda=2$. However, the method of the present disclosure proposed here works for any QAE algorithm, including a proposed method that interpolates between the classical and quantum (so $1\leq\lambda\leq2$) (Ref 9, 23).

Any AE algorithm can readily be implemented in the form specified in this definition: giving $q\geq q_{min}$ suffices to ensure that the QAE algorithm can run at all, and the only subtlety is that not all of the allowed uses of A may actually be used; however, it is taken as being implicit that a QAE algorithm should seek to return the best possible estimate, and thus as many uses of A (up to the maximum) as possible should be used. As will be elucidated in greater detail below, A is constructed from P (namely, one use of P for each use of A).

3. Method

The central idea of the method is to construct a smooth, periodic function, $f(x)$ from g(x), to decompose $f(x)$ as a Fourier series and then perform QAE (Quantum Amplitude Estimation) on each Fourier component individually (full details of how and why this works can be found in this Appendix). This process includes six steps:

1. Construct $f(x)$ from g(x).
2. Symbolically express the Fourier coefficients and harmonic frequency intervals.
3. Construct a symbolic form of A for the estimation of each Fourier component.
4. Assign a number of uses of A for the estimation of each Fourier component.
5. Run QAE for each Fourier component.
6. Return the expectation value.

These details will next be elucidated in greater for these six steps.

3.1 Construction of $f(x)$

The step requires the construction of a smooth (in value and first-derivative), periodic function, $f(x)$ such that $g(x)=f(x)$ over the support of $p(x^{(i)})$. If possible, there is a small advantage in doing this in such a way that g(x) is either is either an even or odd function (or indeed a function that an odd function plus a constant offset). For certain families of functions this may be possible to do in an automated way, and for other functions $f(x)$ may have to be given explicitly. Next, give two examples of equations will be given: $g_i(s)=x$, that is the mean of the distribution that is being estimated. Note that these two can be combined to estimate the variance. In the below $x_{lim}=\max(x_{ul}-xl)$.

3.1.1 Construction of $f_1(x)$ when $g_1(x)=x$ $g_1(x)=x$ (i.e., we are just estimating the mean of $p(x)$) then one appropriate choice is the odd function:

$$f_1(x) = \begin{cases} -x_{lim} - \dfrac{1}{2} + \dfrac{1}{2}(x + x_{lim} + 1)^2 & \text{if } -x_{lim} - 2 \leq x < -x_{lim} \\ x & \text{if } -x_{lim} \leq x < x_{lim} \\ x_{lim} + \dfrac{1}{2} - \dfrac{1}{2}(x - x_{lim} - 1)^2 & \text{if } x_{lim} \leq x < x_{lim} + 2 \\ 2x_{lim} + 2 - x & \text{if } x_{lim} + 2 \leq x < 3x_{lim} + 2 \end{cases} \qquad \text{Eq. 6}$$

3.1.2 Construction of $f_2(x)$ when $g_2(x)=x^2$

Noting that $g_2(x)$ is itself even, one suitable choice is the even function:

$$f_2(x) = \begin{cases} g_2(x) & \text{if } -x_{lim} \leq x < x_{lim} \\ 2g_2(x_{lim}) - g_2(0) - g_2(x - 2x_{lim}) & \text{if } x_{lim} \leq x < 3x_{lim} \end{cases} \qquad \text{Eq. 7}$$

This has been expressed in such a form, as this works for any even $g(x)$.

3.2 Expression of Fourier Co-Efficients and Frequency Intervals

By construction, $f(x)$ is periodic and so it can be expressed as a Fourier series. The goal of this step is thus to find $c$, $\alpha_n$, $b_n$ and $\omega_0$ such that:

$$f(x) = c + \sum_{n=1}^{\infty} a_n \cos(n\omega_0 x) + \sum_{n=1}^{\infty} b_n \sin(n\omega_0 x) \qquad \text{Eq. 8}$$

3.2.1 Expression of Fourier Co-Efficients and Frequency Intervals for $g_\mu(x)$ For the (odd) piecewise function defined in (6) we have:

$$c = 0 \qquad \text{Eq. 9}$$

$$a_n = 0 \qquad \text{Eq. 10}$$

$$b_n = \frac{4}{\pi\omega_0^2 n^3}(\cos(n\omega_0 x_{lim}) - \cos(n\omega_0(x_{lim} + 2))) \qquad \text{Eq. 11}$$

$$\omega_0 = \frac{\pi}{2(x_{lim} + 1)} \qquad \text{Eq. 12}$$

3.2.2 Expression of Fourier Co-Efficients and Frequency Intervals for $G_2(x)$

For the (even) piecewise function in Eq. 7 (with $g_2(s)=x^2$), the following pertain:

$$c = x_{lim}^2 \qquad \text{Eq. 13}$$

$$a_n = -\frac{8\sin(n\pi/2)}{\pi n^3 \omega_0^2} \qquad \text{Eq. 14}$$

$$b_n = 0 \qquad \text{Eq. 15}$$

-continued $$\omega_0 = \frac{\pi}{2x_{lim}} \qquad \text{Eq. 16}$$

More generally, an appropriate symbolic integration software module may enable calculation of $c$, $\alpha_n$, $b_n$, and $\omega_0$ to be performed in an automated fashion. However, it may be worth pre-computing and storing $c$, $\alpha_n$, $b_n$ and $\omega_0$ for appropriate even periodic functions $f(x)$ corresponding to common input functions $g(x)$.

3.3 Construction of A in Symbolic Form

There is now defined a parameterised family of circuits $A_n(\beta)$ which take $x_l$, $\Delta$, $P$, $i$, $\{n, N_l, \ldots, N_d\}$, $\omega_0$ and some integer as inputs. The parameter, $\beta$, which is equal to 0 or $\pi/2$, serves the purpose of introducing an additional rotation when QAE is being used to estimate sinusoidal components. Specifically, it pertains that $A_n(\beta)$ is as given in FIG. 2A.

3.4 Assignation of Uses of A

This step evaluates the number of uses of P assigned to each Fourier component. The goal is to distribute the total number of uses of P such that the overall variance of the estimate is minimised. This can be achieved by setting the number of uses of A for the estimate of the nth Fourier components, denoted $q_n^{(a)}$ for cosinusoidal terms and $q_n^{(b)}$ for sinusoidal terms $q_n^{(a)}$, such that $$q_n^{(a)} = k|a_n|^{2/(\lambda+1)} \qquad \text{Eq. 17}$$

$$q_n^{(b)} = k|b_n|^{2/(\lambda+1)} \qquad \text{Eq. 18}$$

for some constant k chosen such that:

$$q_{tot} = \sum_{n=1}^{n_{max}} q_n^{(a)} + q_n^{(b)} \qquad \text{Eq. 19}$$

where $q_{tot}$ is the total number of uses of P as given in the inputted "stopping criterion" and $n_{max}$ is the maximum Fourier component whose mean is estimated. Justification for this can be found in the Appendix here. To achieve Eq. 19, in such a way that Eq. 17 is approximately satisfied, it will be appreciated that some rounding and truncation will be required. Specifically, $q_n^{(\alpha)}$ and $q_n^{(b)}$ should be integers at least equal to $q_{min}$. There are various ways to do this, but one suitable way when $f(x)$ is even (namely, $b_n=0$ for all n) is:

1. Find the smallest j such that $\alpha_j \neq 0$.
2. Assign $q_j \leftarrow q_{tot}$. Use $q_j$ as the first element of the list $Q=\{q_j\}$.
3. Find the smallest j' such that $j'>j$ and $\alpha_j \neq 0$.
4. Calculate k and thus $q_j'$ such that the relationship of proportionality given in (17) holds for $q_j$ and $q_j'$. Add $q_j$, to Q.
5. Renormalise and round (to integer values) all elements of Q such that they sum to $q_{tot}$.
6. If the value of the minimum element of Q is smaller than $q_{min}$ then undo actions of last instances to steps 4 and 5; else set $j \leftarrow j'$ and go to step 3.

We can see from this that the final value of j will be $n_{max}$. An analogous method can be used for finding $$q_n^{(b)}$$

39 for odd $f(x)$, and a slightly extended version can be used for general functions.

3.5 Execution of QAE (Quantum Amplitude Estimation) for Each Fourier Component

For all n, such that $1 \leq n \leq n_{max}$:

$$\mu_n^{(a)} = 1 - 2QAE(A_n(0), q_n^{(a)})$$

$$\mu_n^{(b)} = 1 - 2QAE(A_n(\pi/2), q_n^{(b)})$$

3.6 Estimation and Return of the Estimated Expectation Value

The expectation estimate is returned directly:

$$\text{Return } c + \sum_{n=1}^{n_{max}} a_n \mu_n^{(a)} + \sum_{n=1}^{n_{max}} b_n \mu_n^{(b)}$$

4. An Adaptive Approach

The method outlines in Steps 1 to 6 above can be used as part of an adaptive algorithm in a variety of different ways. In this section, there is elucidated in overview one such way where the QAE algorithm returns the estimates of the various $\mu_n^{(a)}$, $\mu_n^{(b)}$ as distributions, namely not point estimates, and a Bayesian approach is then used. That is, by noting that the function of Step 4 is to distribute optimally the allowed uses of P amongst the Fourier components so as to achieve the lowest variance estimate, it will be appreciated that this can readily be adjusted to fit a Bayesian framework where a "prior" distribution is included as an input and after the QAE a posterior distribution is returned. This would entail modifying Steps 4 and 5 such that the following three steps could be looped over (where $$q'_{tot} = q_{tot}/L):$$

For l=1 to L perform the following steps:
Step 4: Using a prior distribution for $$\mu_n^{(a)}, \mu_n^{(b)}$$

find an optimal assignment of $$q_n^{(a)}, q_n^{(b)}$$

such that $$\sum q_n^{(a)} + q_n^{(b)} = q'_{tot}.$$

For the first instance of this step, a uniform prior (or other such suitable choice) is used.
Step 5: (unchanged) calculate $$\mu_n^{(a)} = QAE(A_n(0), q_n^{(a)}) \text{ and } \mu_n^{(b)} = QAE(A_n(\pi/2), q_n^{(b)})$$

40

Step 5a: Use Bayes' rule to find the posterior distribution from the prior and the results of step 5, and set this as the next prior when step 4 is looped back to.

It should be noted that dividing up the total number of calls to P into equally sized parts to loop over is used for convenience and other (possible themselves adaptive) methods could be used. Moreover, in the adaptive setting it makes sense to supplement the stopping criteria with a desired MSE, and to also update a probability distribution of the actual expectation value being estimated in Step 5A, so that the looping process can be terminated early if sufficient accuracy has been obtained.

If Step 5A is also allowed to estimate the expectation value, which is conveniently denoted as (l) for the lth step, then the natural way to frame Step 4 in the adaptive algorithm is to minimise the Bayes risk or the expected mean squared error, namely the $(l+1)^{th}$ iteration of Step 4 should distribute the uses of P so as to minimise:

$$\mathbb{E}((\mu(l+1) - \mathbb{E}(\mu(l)))^2) \qquad \text{Eq. 20}$$

In some cases, if Step 5A is also allowed to estimate the expectation value, another way to frame Step 4 in the adaptive algorithm can be maximizing an expected mutual information is maximized.

These optimisation will depend on a characterisation of how the QAE subroutine of choice suppresses the MSE, and this could in turn depend on some characterisation of the noise. For example, deep circuits may incur more noise and thus be disadvantageous to some theoretical noiseless characteristic.

5. Functions of Multiple Variables

The method of the present disclosure naturally generalises to computing the mean of products of functions of multiple random variables. For instance, if it is desired to compute the expectation (for simplicity, and without loss of generality, it is assumed that the probability distribution dimensions have been ordered such that it is the first D dimensions for which this product of expectations is taken):

$$E(g_1(X^{(1)}) \times g_2(X^{(2)}) \times \ldots \times g_{n_i}(X^{(D)})) \qquad \text{Eq. 21}$$

then the expectation can be computed by the following process. Firstly, almost the same inputs are used:

(i) A circuit, P, that prepares |p⟩ , namely P is such that |p⟩ =P|0⟩.

(ii) Two or more dimensions of interest.

(iii) Specification of the support of $p(x^{(1)})$ . . . $p(x^{(D)})$. These are given as the value that the first point of the distribution corresponds to, $x_I^{(1)}$ . . . $x_I^{(D)}$ and the spacing intervals, $\Delta^{(I)}$ . . . . $\Delta^{(D)}$.

(iv) Functions $g_I(x)$ . . . $g_D(x)$, which are continuous and have continuous first derivatives over the support of $p(x^{(I)})$ . . . $p(x^{(D)})$.

(v) A stopping criterion.

and then follow almost the same process as for the single variable case:

1. Construct $f_I(x)$ . . . $f_D(x)$ from $g_I(x)$ . . . $g_D(x)$ respectively.

2. Symbolically express the Fourier coefficients and harmonic frequency intervals for $f_I(x)$ . . . $f_D(x)$ from $g_I(x)$ . . . $g_D(x)$.

3. Construct symbolic forms of A.

4. Assign number of uses of A.

5. Run Quantum Amplitude Estimation (QAE).

6. Return the expectation value.

The scope of this method is very general and a sketch of a proof of the quantum is given in Appendix C. However, here it is useful to give specific details for an important special case; in particular, the expectation of the product of the $i^{th}$ and $j^{th}$ dimensions of the multi-dimensional random variable:

$$E\big(X^{(i)}X^{(j)}\big) = \sum_{x^{(i)}}\sum_{x^{(j)}} x^{(i)}x^{(j)} p\big(x^{(i)}, x^{(j)}\big) \qquad \text{Eq. 22}$$

which can be combined with mean estimates for $X^{(i)}$ and $X^{(j)}$ (for example using the quantum algorithm specified above) to estimate the covariance, a very important statistical quantity:

$$\operatorname{cov}\big(X^{(i)}, X^{(j)}\big) = E\big(X^{(i)}X^{(j)}\big) - E\big(X^{(i)}\big)E\big(X^{(j)}\big) \qquad \text{Eq. 23}$$

In this case, there is obtained the mean of the product of functions of two random variables such that $g_i(x)=g_2(x)=x$. So it follows that it is feasible to use $f_\mu(x)$, as defined in Eq. 6 for both $f_1(x)$ and $f_2(x)$, that is there is obtained:

$$f_1(x) = \sum_{n-1}^{\infty} b_n^{(1)}\sin\big(n\omega_0^{(1)}x\big) \qquad \text{Eq. 24}$$

$$f_2(x) = \sum_{m-1}^{\infty} b_n^{(2)}\sin\big(nm\omega_0^{(2)}x\big) \qquad \text{Eq. 25}$$

wherein $$b_n^{(1)} = \frac{4}{\pi(\omega_0^{(1)})^2 n^3}\big(\cos\big(n\omega_0^{(1)}x_{lim}^{(i)}\big) - \cos\big(n\omega_0^{(1)}\big(x_{lim}^{(i)} + 2\big)\big)\big) \qquad \text{Eq. 26}$$

$$\omega_0^{(1)} = \frac{4\pi}{2(x_{lim}^{(i)} + 1)} \qquad \text{Eq. 27}$$

$$b_m^{(2)} = \frac{4}{\pi(\omega_0^{(2)})^2 n^3}\big(\cos\big(n\omega_0^{(2)}x_{lim}^{(j)}\big) - \cos\big(n\omega_0^{(2)}\big(x_{lim}^{(j)} + 2\big)\big)\big) \qquad \text{Eq. 28}$$

$$\omega_0^{(2)} = \frac{\pi}{2(x_{lim}^{(j)} + 1)} \qquad \text{Eq. 29}$$

This covers Steps 1 and 2 for the special case of $E(X^{(i)}X^{(j)})$ and the circuits of Step 3 are of the form given in FIG. 2B. In Step 4, we assign uses of $\overline{A}_{n,m}$ such that:

$$q_{n,m} = k\big(\big|b_n^{(1)}\big|\big|b_m^{(2)}\big|\big)^{2/(\lambda+1)} \qquad \text{Eq. 30}$$

where k is such that $2\Sigma_{n,m}\, q_{n,m}=q_{tot}$ (the factor of 2 because we require two calls to QAE for each Fourier component). Steps 5 and 6 are therefore, respectively:

For all $n=1 \ldots n_{max}$, $m=1 \ldots m_{max}$:

$\mu_{n,m}=$QAE$(\overline{A}_{n,m},\, q_{n,m})$–QAE$(\overline{A}_{n,-m},\, q_{n,m})$ And then:

Return:

$$\sum_{n=1}^{n_{max}} \sum_{m=1}^{m_{max}} b_n^{(1)} b_m^{(2)} \mu_{n,m}$$

A Theory

In this Appendix, theoretical results will be provided to support the claim of efficiency of the proposed method of the present disclosure. For simplicity, in the following analysis, there is addressed the case of finding the mean of a univariate distribution (i.e. g(x)=x); however, the analysis can easily be extended to the general case considered in the main document. Moreover, for simplicity, there is considered a probability distribution that has support from x=1 to x=2; however, it should be appreciated that when the expectation is simply of samples from the probability distribution itself (without any function applied), the any (univariate) probability distribution can be shifted and scaled such that its support is a desired interval (i.e. x=1 to x=2 in this case).

A1 Asymptotic Performance of the Proposed Method of the Present Disclosure

As before, it assumed that a circuit is available that prepares a state encoding a probability distribution, p(x), in the form:

$$|p\rangle = \sum_x \sqrt{p(x)}\,|x\rangle \qquad \text{Eq. 31}$$

We can use such a register to control a series of rotation (Ry) gates on an additional qubit to prepare the state:

$$|\psi\rangle = \sum_x \sqrt{p(x)}\,|x\rangle\,(\cos((r/2)x)\,|0\rangle + \sin((r/2)x)\,|1\rangle) \qquad \text{Eq. 32}$$

for some constant r. The fact that x has been shifted and scaled just means that that there may be an additional unconditional rotation, and the angles of the controlled rotations will be scaled. By using QUA, from this it can be estimates:

$$\sum_x \sin^2\big((r/2)x\big)p(x) = \qquad \text{Eq. 33}$$

$$\sum_x 0.5(1 - \cos(rx))p(x) = 0.5\Big(1 - \sum_x \cos(rx)p(x)\Big)$$

if there is now used $$|\psi\rangle = \sum_x \sqrt{p(x)}\,|x\rangle\,(\cos((r/2)x - \pi/4)\,|0\rangle + \sin((r/2)x - \pi/4)\,|1\rangle) \qquad \text{Eq. 34}$$

$$\sum_x \sin^2\big((r/2)x - \pi/4\big)p(x) = \qquad \text{Eq. 35}$$

$$\sum_x 0.5\big(1 - \cos(rx - \pi/2)\big)p(x) = 0.5\Big(1 - \sum_x \sin(rx)p(x)\Big)$$

A1.1.1 Fourier Analysis

For simplicity, just the simple case will be considered where it is desired to approximate the expectation:

$$\mu = \sum_x xp(x) \qquad \text{Eq. 36}$$

However, as p(x) is zero everywhere outside of $1\leq x\leq 2$, it will be appreciated that μ can be evaluated by replacing x by any function $f(x)$ so long as $f(x)=x$ in the region $1\leq x\leq 2$. That is, there is obtained:

$$\mu = \sum_x f(x)p(x) \qquad \text{Eq. 37}$$

Conveniently, it is chosen that $f(x)$ to be periodic such that Fourier analysis can be used. Let $f(x)$ have period 6 such that:

$$f(x) = \begin{cases} \dfrac{1}{2} + \dfrac{x^2}{2} & \text{if } -1 \le x < 1 \\ x & \text{if } 1 \le x < 2 \\ 2.5 - \dfrac{(x-3)^2}{2} & \text{if } 2 \le x < 4 \\ 6 - x & \text{if } 4 \le x < 5 \end{cases} \qquad \text{Eq. 38}$$

which is plotted in FIG. 4. Notably, this is a periodic, even function with continuous value and derivative; the first discontinuity appears in the second derivative. This means that the Fourier series will consist only of a constant and cosine terms; and that the Fourier coefficients will decay as $1/(n^3)$. That is:

$$f(x) = c + \sum_{n=1}^{\infty} \frac{a_n'}{n^3} \cos(n\omega_0 x) \qquad \text{Eq. 39}$$

where $\alpha'_n$ may vary from one term to the next, but has no asymptotic dependence on n. Thus, we can upper bound $\alpha' n \le \alpha_{max}$ for all n. Moreover, for the periodic piecewise function that has been defined above, it is found that:

$$c = 1.5 \qquad \text{Eq. 40}$$

$$a_n' = -\frac{2}{3}\left(\frac{3}{\pi}\right)^3 \left(\sin(n\pi/3) + \sin(2n\pi/3)\right) \qquad \text{Eq. 41}$$

$$\omega_0 = \frac{\pi}{3} \qquad \text{Eq. 42}$$

which means it is feasible to set:

$$a_{max} = 0.581 \qquad \text{Eq. 43}$$

Note that other piecewise functions could have been used; however, this one was chosen as it was relatively easy to explicitly evaluate the Fourier series. This was achieved by differentiating the function twice, which gives a sum of two pulse waves; using the standard Fourier series for these, then integrating twice.

A.1.2 Using the Fourier Series to Approximate the Expectation

Substituting Eq. 39 into Eq. 37, there is derived:

$$\mu = \sum_x f(x)p(x) \qquad \text{Eq. 44}$$

$$= \sum_x \left(c + \sum_{n=0}^{\infty} \frac{a_n'}{n^3}\cos(n\omega_0 x)\right)p(x)$$

$$= c + \sum_{n=1}^{\infty} \frac{a_n'}{n^3}\left(\sum_x \cos(n\omega_0 x)p(x)\right)$$

It will be appreciated that the parenthesised term exactly corresponds to what is feasible to use the quantum computer 40 to calculate. Obviously, it is not feasible to evaluate all terms in this infinite sum. Thus, it is assumed that the summation is truncated at some $n_{max}$. Conveniently, $\mu_n$ is used to denote the $n^{th}$ expectation, wherein it is then feasible to perform the following series expansion:

$$\mu_n = \sum_x \cos(n\omega_0 x)p(x) \qquad \text{Eq. 45}$$

which is compute numerically, and thus only to obtain an approximation thereto, denoted $\hat{\mu}_n$, with an error $\hat{\epsilon}_n$ that is given in Eq. 46:

$$\mu_n = \hat{\mu}_n + \hat{\epsilon}_n \qquad \text{Eq. 46}$$

Therefore, we can define the overall approximation $\hat{\mu}$ to $\mu$, $$\hat{\mu} = c + \sum_{n=1}^{n_{max}} \hat{\mu}_n \qquad \text{Eq. 47}$$

That is, $$\mu = \hat{\mu} + \sum_{n=1}^{n_{max}} \frac{a_n'}{n^3}\hat{\epsilon}_n + \sum_{n=n_{max}+1}^{\infty} \frac{a_n'}{n^3}\left(\sum_x \cos(n\omega_0 x)p(x)\right) \qquad \text{Eq. 48}$$

From this result of Eq. 47, the MSE can be addressed. It is noted that precluded a possibility is not precluded that the estimation is biased, so there is let $$\hat{\epsilon}_n = \hat{\epsilon}_n' + \mu_{\epsilon_n},$$

where $\mu_{\epsilon_n}$ is the bias and $$\hat{\epsilon}_n'$$

is a zero-mean random variable. More, there is also permitted that:

$$\mu_\epsilon = \sum_{n=1}^{n_{max}} \frac{a_n'}{n^3}\mu_{\epsilon_n} \qquad \text{Eq. 49}$$

$$\epsilon_{trunc} = \sum_{n=n_{max}+1}^{\infty} \frac{a_n'}{n^3}\left(\sum_x \cos(n\omega_0 x)p(x)\right) \qquad \text{Eq. 50}$$

so that there can be derived therefrom that:

$$\hat{\epsilon}^2 = \mathbb{E}((\mu - \hat{\mu})^2) \qquad \text{Eq. 51}$$

$$= \mathbb{E}\left(\left(\mu_\epsilon + \sum_{n=1}^{n_{max}} \frac{a_n'}{n^3}\hat{\epsilon}_n' + \epsilon_{trunc}\right)^2\right)$$

-continued $$= \mu_\epsilon^2 + \sum_{n=1}^{n_{max}} \left(\frac{a'_n}{n^3}\right)^2 \mathbb{E}\left((\hat{\epsilon}'_n)^2\right) + \hat{\epsilon}^2_{trunc} + \mu_\epsilon \epsilon_{trunc}$$

using the fact that estimates corresponding to the various terms in the Fourier series are independent. It is next assumed that the quantum computer 40 is used to perform each of the estimates, and each Fourier component is assigned a number of uses of P that varies with n such that $$q_n^{(a)} = q_0 n^{-\kappa} \qquad \text{Eq. 52}$$

As before, it pertains that the MSE, $\hat{\epsilon}^2$ is proportional to $$\left(q_n^{(a)}\right)^{-\lambda},$$

and as the following analysis is more readily presented in terms of expressions of equality, not proportionality here and below there is used "k" with incremented indices as constants of proportionality. Thus, it pertains that $\hat{\epsilon}^2 = k_1 q^{-\lambda}$. It is then next feasible to address the terms in Eq. 51 in turn. Firstly, it is noted that the bias is upper bounded by the square root of the MSE, such that:

$$\mu_\epsilon \le a_{max} \sqrt{k_1} \sum_{n=1}^{n_{max}} \frac{1}{n^3} \left(q_n^{(a)}\right)^{-\lambda/2} \qquad \text{Eq. 53}$$

$$\le a_{max} \sqrt{k_1} \, q_0^{-\lambda/2} \sum_{n=1}^{\infty} n^{\kappa\lambda/2 - 3}$$

$$\le k_2 q_0^{-\lambda/2}$$

so long as $\kappa$ is chosen such that $\kappa < 4/\lambda$ and the sum therefore converges. For the second term, clearly $$\mathbb{E}\left((\hat{\epsilon}'_n)^2\right)$$

is upper-bounded by $$k_1 \left(q_n^{(a)}\right)^{-\lambda}$$

(this would hold with equality for an unbiased estimator and would be strictly less for an estimator with non-zero bias). Thus, there is derived therefrom that:

$$\sum_{n=1}^{n_{max}} \left(\frac{a'_n}{n^3}\right)^2 \mathbb{E}\left((\hat{\epsilon}'_n)^2\right) \le k_1 \sum_{n=1}^{n_{max}} \left(\frac{a'_n}{n^3}\right)^2 \left(q_n^{(a)}\right)^{-\lambda} \qquad \text{Eq. 54}$$

$$\le a_{max} k_1 q_0^{-\lambda} \sum_{n=1}^{\infty} n^{\kappa\lambda - 6}$$

$$= k_3 q_0^{-k}$$

wherein the previous condition, $\kappa < 4/\lambda$ suffices to ensure that this sum also converges. Finally, when the truncation error is addressed, it is observed that cos (nx) is bounded above by 1 for all x, and so $$\sum_x \cos(n\omega_0 x) p(x) \le 1 \qquad \text{Eq. 55}$$

so there is thereby derived $$\epsilon_{trunc} \le \sum_{n=n_{max}+1}^{\infty} \frac{a'_n}{n^3} \qquad \text{Eq. 56}$$

$$\le a_{max} \sum_{n=n_{max}+1}^{\infty} \frac{1}{n^3}$$

$$\le a_{max} \int_{n_{max}+1}^{\infty} \frac{1}{(x-1)^3} dx$$

$$= \frac{a_{max}}{2 n_{max}^2}$$

Substituting these into Eq. 51, there is derived:

$$\hat{\epsilon}^2 = \left(k_2^2 + k_3\right) q_0^{-\lambda} + \frac{a_{max}^2}{4 n_{max}^4} + k q_0^{-\lambda/2} \frac{a_{max}}{2 n_{max}^2} \qquad \text{Eq. 57}$$

From which, in order to achieve $$\hat{\epsilon}^2 \propto q_0^{-\lambda} \hat{\epsilon}^2 \propto q_0^{-\lambda},$$

it suffices to choose new such that:

$$n_{max} \propto q_0^{\lambda/4}, \qquad \text{Eq. 58}$$

It is now feasible to count up the total number of uses of P in the case where a QAE such that $\lambda=2$ is used (that is, a standard QAE). Firstly, there pertains that $\kappa < 2$ (i.e., because $4/\lambda = 4/2 = 2$), so it is allowed that $$\kappa = 2 - \delta \qquad \text{Eq. 59}$$

for some $\delta > 0$. The above analysis implicitly allows $$\left(q_n^{(a)}\right)$$

to take fractional values; however, in practise it is necessary to round to an integer. To ensure that the claims of convergence hold, it is beneficial to round up in each case. At worst, all $$\left(q_n^{(a)}\right)$$

may need to be rounded up for all $n_{max}$, which means there is optionally required one or more extra $n_{max}$ operations at worst. Thus, it is then feasible to evaluate the total number of operations:

$$q = \sum_{n=1}^{n_{max}} q_n^{(a)} + n_{max}$$

$$= q_0 \sum_{n=1}^{n_{max}} \frac{1}{n^{2-\delta}} + n_{max}$$

$$\leq q_0 \sum_{n=1}^{\infty} \frac{1}{n^{2-\delta}} + k_4 q_0^{1/2}$$

$$\in O(q_0)$$

Eq. 60 as long as $\delta < 1$ (note this can be achieved, as it is only restricted such that $\delta$ is positive). That is, the total number of queries is proportional to $q_0$. Therefore, it is derived that $\hat{\epsilon}^2 \propto q^{-2}$: there is thereby achieved the same asymptotic performance without required arithmetic operations to be performed on the quantum computer 40.

A.2 Practical Assignation of Uses of P

In an actual implementation of the algorithm, it is necessary to decide how to distribute optimally some number of uses of P between estimates of different Fourier components. To do this, it is assumed that the estimators are unbiased (this is probably a reasonable assumption to make for the purposes of actually finding a good way to assign uses of P in practise, and it is noted that the QAE method amplitude estimation without phase estimation is asymptotically unbiased [1]). Furthermore, it is assumed that no explicit truncation and that no non-integer values of $$q_n^{(a)}, q_n^{(b)}$$

are permitted in order to find an optimal assignation. Extending Eq. 51 and Eq. 53 for the general (namely, not necessary an even function) case, there is thereby derived that:

$$\hat{\epsilon}^2 = \sum_{n=1}^{\infty} a_n^2 \left(q_n^{(a)}\right)^{-\lambda} + b_n^2 \left(q_n^{(b)}\right)^{-\lambda}$$

Eq. 61

Noting that there are $q_{tot}$ total uses of P, it is therefrom feasible to formulate an optimisation problem:

Minimize: $\hat{\epsilon}^2$

Subject to: $\sum_{n=1}^{\infty} q_n^{(a)} + q_n^{(b)} = q_{tot}$

Thus, using a Lagrange multiplier L, it is feasible to find the minimum of:

$$\hat{\epsilon}^2 - \mathcal{L}\left(\sum_{n=1}^{\infty} \left(q_n^{(a)}\right) + \left(q_n^{(b)}\right) - q_{tot}\right)$$

Differentiating with respect to $q_n^{(a)}$ and $q_n^{(b)}$, there is thereby derived that:

$$\frac{\partial}{\partial q_n^{(a)}}\left(\sum_{n=1}^{\infty} a_n^2 \left(q_n^{(a)}\right)^{-\lambda} + b_n^2 \left(q_n^{(b)}\right)^{-\lambda} - \mathcal{L}\left(\sum_{n=1}^{\infty} q_n^{(a)} + q_n^{(b)} = q_{tot}\right)\right) =$$

Eq. 62

-continued $$\frac{\partial}{\partial q_n^{(b)}}\left(\sum_{n=1}^{\infty} a_n^2 \left(q_n^{(a)}\right)^{-\lambda} + b_n^2 \left(q_n^{(b)}\right)^{-\lambda} - \mathcal{L}\left(\sum_{n=1}^{\infty} q_n^{(a)} + q_n^{(b)} = q_{tot}\right)\right) = \frac{\lambda a_n^2 \left(q_n^{(a)}\right)^{-(\lambda+1)} - \mathcal{L}}{\lambda b_n^2 \left(q_n^{(b)}\right)^{-(\lambda+1)} - \mathcal{L}}$$

Eq. 63

Setting this equal to zero and solving for $$q_n^{(a)} \text{ and } q_n^{(b)},$$

it is found that:

$$q_n^{(a)} = k|a_n|^{2/(\lambda+1)}$$

Eq. 64

$$q_n^{(b)} = k|b_n|^{2/(\lambda+1)}$$

Eq. 65 for some constant k, as specified in Eq. 17 and Eq. 18. Finally, it will be noticed that if it is considered that the envelopes of $|\alpha_n|$ and $|b_n|$ decay as $n^{-3}$ for the piecewise functions considered herein, then for $\lambda=2$ all $$q_n^{(a)}, q_n^{(b)}$$

decay as $n^{-3}$ which is the limiting case of Eq. 52 according to the restrictions culminating in Eq. 59.

B Numerical Results

In the following, there are provided preliminary numerical results for g(x)=x, namely for mean estimation. These results are generated using an even function expansion of g(x)=x. The numerical results were obtained from an experimental set-up as follows:

(i) There was used a state preparation circuit
P=(R_y(π/2.5)⊗I)CNOT(R_y(π/2.5)⊗R_y(π/1.9)), which prepares the univariate four-point distribution [0.0358, 0.0613, 0.4515, 0.4515]. The support of the distribution was taken as [1.125, 1.375, 1.625, 1.875].

(ii) Amplitude estimation without phase estimation was used as the quantum amplitude estimation (QAE) algorithm with $N_{shots}=50$.

(iii) The probability mass functions were estimated over a grid with 5001 points in each case.

(iv) Results for MSE were obtained by averaging over 1000 runs.

The results are shown in FIG. 5, wherein there is shown superior convergence for the proposed method of the present disclosure versus that of classical Monte-Carlo, and for the proposed method of the present disclosure versus the method of Ref. 4 (Rescaled Quantum Monte Carlo Integration (RQMCI), also known as Optional Pricing method).

C Functions of More than One Variable

Suppose there is provided a multivariate probability distribution encoded in a quantum state, and it is desired to evaluate the expectation of some function of multiple random variables:

$$E = \sum_{x^{(1)}} \sum_{x^{(D)}} h\left(x^{(1)} \ldots x^{(D)}\right) p\left(x^{(1)} \ldots x^{(D)}\right)$$

Eq. 66 wherein it is next shown that there is a quadratic quantum advantage when h can be decomposed such that $$h\left(x^{(1)}\dots x^{(D)}\right) = \sum_{i=1}^{H} h_i^{(1)}\left(x^{(1)}\right) \times h_i^{(2)}\left(x^{(2)}\right) \times \dots \times h_i^{(D)}\left(x^{(D)}\right) \qquad \text{Eq. 67}$$

that is, h can be expressed as a sum of functions, where each such function is the product of functions acting on only one random variable. For now, it is assumed that H to be finite; however, there may be specific instances of infinite sums which can be truncated whilst maintaining the overall estimation accuracy (that is, if the contribution towards the overall function value decays with i). Furthermore, it will be appreciated that substituting Eq. 67 into Eq. 66 simply amounts to calculating the multiple expectations and summing them, therefore for simplicity it is assumed that H=1 in the following analysis. If H is some constant greater than one, this simply amounts to a corresponding increase in the expression for the convergence with q, such that the asymptotic expression is not affected by his simplification. Thus, it follows that in this disclosure, there is provided a quantum algorithm for estimating:

$$E = \sum_{x^{(i)}}\dots\sum_{x^{(D)}}\left(h^{(1)}\left(x^{(1)}\right)\times h^{(2)}\left(x^{(2)}\right)\times\dots\times h^{(D)}\left(x^{(D)}\right)\right)p\left(x^{(1)}\dots x^{(D)}\right) \qquad \text{Eq. 68}$$

C.1 Sketch of a General Quantum Algorithm

Once again, it is presumed that the functions $h^{(1)}(x^{(1)})\times h^{(D)}(x^{(D)})$ are extended as periodic functions, and then decomposed as Fourier series. Thus, Eq. 68 is susceptible to being rewritten as:

$$E = \sum_{x^{(1)}}\dots \qquad \text{Eq. 69}$$

$$\sum_{x^{(D)}}\left(\prod_{j=1}^{D}\left(c^{(j)} + \sum_{n1}^{\infty} a_n^{(j)}\cos\left(n\omega_0^{(j)}\right) + b_n^{(j)}\sin\left(n\omega_0^{(j)}x^{(j)}\right)\right)\right)p\left(x^{(1)}\dots x^{(D)}\right)$$

Multiplying out the product, and changing the order of summation, there are obtained terms of the form (for example):

$$\sum_{x^{(1)}}\dots\sum_{x^{(D)}} a_1^{(1)}\cos\left(\omega_0^{(1)}x^{(1)}\right)a_4^{(2)}\cos \qquad \text{Eq. 70}$$

$$\left(4\omega_0^{(2)}x^{(2)}\right)b_3^{(3)}\sin\left(3\omega_0^{(3)}x^{(3)}\right)c^{(4)}b_3^{(6)}\sin\left(3\omega_0^{(6)}x^{(6)}\right)\dots$$

Thus, each term is a product of sines and cosines. By using repeated applications of the rules:

$$\cos a \cos b = \frac{\cos (a-b) + \cos (a+b)}{2} \qquad \text{Eq. 71}$$

$$\sin a \sin b = \frac{\cos (a-b) - \cos (a+b)}{2} \qquad \text{Eq. 72}$$

$$\sin a \cos b = \frac{\sin (a+b) + \sin (a-b)}{2} \qquad \text{Eq. 73}$$

it is feasible to write out as a sum of terms containing a single sine or cosine operation acting on a sum of the angles. There can then be used the techniques described above to find the corresponding expectations.

Convergence and Complexity

Noting that D and H are constants, and having already shown in the original document that the infinite Fourier series can be truncated, it is derived that the ostensibly convoluted procedure sketched in the foregoing is actually asymptotically efficient in terms of the rate of convergence when executed on the quantum computer 40. However, in reality, the method will be impractical for all but relatively simple multi-variate functions, and for this reason the present disclosure will focus on a simple (and important) example, including demonstrating an asymptotic quantum computational advantage.

C.2 Example: Covariance Calculation

The covariance is an important measure of statistical correlation in multivariate distributions, and is defined as being:

$$\text{cov}\left(X^{(i)}, X^{(j)}\right) = E\left(X^{(i)}X^{(j)}\right) - E\left(X^{(i)}\right)E\left(X^{(j)}\right) \qquad \text{Eq. 74}$$

The univariate expectations, $E(X^{(i)})$ and $E(X^{(j)})$ can be calculated using the method in Section 3, so the following analysis will focus on $E(X^{(i)})X^{(j)}$:

$$E\left(X^{(i)}X^{(j)}\right) = \sum_{x^i}\sum_{x^{(j)}} x^{(i)}x^{(j)}p\left(x^{(i)}, x^{(j)}\right) \qquad \text{Eq. 75}$$

Using $f_\mu(x)$ as defined in Eq. 6 as specified in Eq. 24 to Eq. 29:

$$E\left(X^{(i)}X^{(j)}\right) = \sum_{x^i}\sum_{x^{(j)}} f_1\left(x^{(i)}\right)f_2\left(x^{(j)}\right)p\left(x^{(i)}, x^{(j)}\right) \qquad \text{Eq. 76}$$

$$= \sum_{x^{(1)}}\sum_{x^{(j)}}\left(\sum_{n=1}^{\infty}\frac{\bar{b}_n^{(1)}}{n^3}\sin\left(n\omega_0^{(1)}x^{(i)}\right)\right)\left(\sum_{m=1}^{\infty}\frac{\bar{b}_m^{(2)}}{m^3}\sin\left(m\omega_0^{(2)}x^{(j)}\right)\right)p\left(x^{(i)}, x^{(j)}\right)$$

$$= \sum_{n=1}^{\infty}\sum_{m=1}^{\infty}\frac{\bar{b}_n^{(1)}\bar{b}_m^{(2)}}{(nm)^3}\left(\sum_{x^{(i)}}\sum_{x^{(j)}}\sin\left(n\omega_0^{(1)}x^{(i)}\right)\sin\left(m\omega_0^{(2)}x^{(j)}\right)p\left(x^{(i)}, x^{(j)}\right)\right)$$

$$= \sum_{n=1}^{\infty}\sum_{m=1}^{\infty}\frac{\bar{b}_n^{(1)}\bar{b}_m^{(2)}}{2(nm)^3}$$

$$\left(\sum_{x^{(i)}}\sum_{x^{(j)}}\cos\left(n\omega_0^{(1)}x^{(i)} - n\omega_0^{(2)}x^{(j)}\right) - \cos\left(n\omega_0^{(1)}x^{(i)} + m\omega_0^{(2)}x^{(j)}\right)\right)p\left(x^{(i)}, x^{(j)}\right)\right)$$

$$= \sum_{n=1}^{\infty}\sum_{m=1}^{\infty}\frac{\bar{b}_n^{(1)}\bar{b}_m^{(2)}}{2(nm)^3}\left(\sum_{x^{(i)}}\sum_{x^{(j)}}\cos\left(n\omega_0^{(1)}x^{(i)} - m\omega_0^{(2)}x^{(j)}\right)p\left(x^{(i)}, x^{(j)}\right) - \right.$$

$$\left. \sum_{x^{(i)}}\sum_{x^{(j)}}\cos\left(n\omega_0^{(1)}x^{(i)} - m\omega_0^{(2)}x^{(j)}\right)p\left(x^{(i)}, x^{(j)}\right)\right)$$

where $$\bar{b}_n^{(1)} = b_n^{(1)}/n^3 \text{ and } \bar{b}_m^{(2)} = b_m^{(2)}/m^3. \qquad \text{Eq. 76}$$

A circuit which prepares a state (when operating on |0> such that the amplitude of the last qubit is $$5 \times \left(1 - \sum_{x^{(i)}} \sum_{x^{(j)}} \cos\left(n\omega_0^{(1)} x^{(i)} + m\omega_0^{(2)} x^{(j)}\right) p\left(x^{(i)}, x^{(j)}\right)\right)$$

as is given in FIG. 3.

There will next be assessed the computational complexity and convergence. For simplicity, there will not explicitly be taken account of truncation and rounding, and it is assumed that all QAE estimates are independent and unbiased. If these assumptions were to be removed, then the ultimate result would still hold, but a much more in-depth analysis (along the lines already given in the original document) would be required. Let each QAE algorithm to estimate $$\sum_{x^{(i)}} \sum_{x^{(j)}} \cos\left(n\omega_0^{(1)} x^{(i)} \pm m\omega_0^{(2)} x^{(j)}\right) p\left(x^{(i)}, x^{(j)}\right)$$

be assigned $q_{n,m}$ uses of the state preparation circuit. Moreover, let $$q_{n,m} = q_0(nm)^{-\kappa} \qquad \text{Eq. 77}$$

wherein $1 < \kappa < 2$, and a QAE algorithm is used that $\lambda = 2$. Now, the convergence and computational complexity can next be assessed. Firstly, addressing the convergence, the MSE is given by:

$$\bar{\epsilon}^2 = 2\kappa_5 \sum_{n=1}^{\infty} \sum_{m=1}^{\infty} \left(\frac{\bar{b}_n^{(1)} \bar{b}_m^{(2)}}{(2nm)^3}\right)^2 q_0^{-2}(nm)^{2\kappa} \qquad \text{Eq. 78}$$

$$\leq \kappa_6 q_0^{-2} \left(\sum_{n=1}^{\infty} n^{2\kappa-6}\right)\left(\sum_{m=1}^{\infty} m^{2\kappa-6}\right)$$

$$= \kappa_7 q_0^{-2}$$

wherein the "$\leq$" merely signified that $$\bar{b}_n^{(1)} \text{ and } \bar{b}_m^{(2)}$$

have implicitly been upper-bounded by a (constant) maximum that can be found. Moreover, it is to be noted that in the top line, the constant factor "2" has not been absorbed into $k_s$ to emphasise the fact that each Fourier component requires two QAE executions (one for each of plus and minus in $$\sum_{x^{(i)}} \sum_{x^{(j)}} \cos\left(n\omega_0^{(1)} x^{(i)} \pm m\omega_0^{(2)} x^{(j)}\right) p\left(x^{(i)}, x^{(j)}\right).$$

Finally, it is to be noted that there is continued the convention of using k with some incremental subscript to denote constants with whose exact value are not of concern. From this, it will be appreciated that because each of the sums converges to a constant, the convergence is proportional to $$q_0^{-2}.$$

Now, counting up the total number of operations:

$$q_{tot} = q_0 \sum_{n=1}^{\infty} \sum_{n=1}^{\infty} (nm)^{-\kappa} \qquad \text{Eq. 79}$$

$$= q_0 \left(\sum_{n=1}^{\infty} n^{-\kappa}\right)\left(\sum_{m=1}^{\infty} m^{-\kappa}\right)$$

$$= \kappa_8 q_0$$

Thus, it will be appreciated that, with the number of operations proportional to $q_0$, there is achieved an MSE of $q_0^{-2}$, and thus the quantum quadratic advantage is upheld for estimation of the expectation of the product of two random variables (which is required to find the covariance). Such a rapid convergence is desirable for the quantum computing system 10 to exhibit quantum advantage when performing computations relative to just using a conventional classic computer for executing such arithmetic tasks.

REFERENCES

Ref 1: Y. Suzuki, S. Uno, R. Raymond, T. Tanaka, T. Onodera, and N. Yamamoto, "*Amplitude estimation without phase estimation*", Quantum Information Processing, vol. 19, no. 2, January 2020 [Online].

Ref 2: D. Grinko, J. Gacon, C. Zoufal, and S. Woener, "*Iterative quantum amplitude estimation*", 2019

Ref 3: S. Aaronson and P. Rall, "*Quantum approximate counting, simplified*", Symposium on Simplicity in Algorithms, pp. 24-32, January 2020.

Ref 4: N. Stamatopoulos, D. J. Egger, Y. Sun, C. Zoufal, R. Iten, N. Shen, and S. Woerner, "*Option pricing using quantum computers*", Quantum, vol. 4, pp. 291, July 2020.

Ref 5: S. Woerner and D.J. Egger, "*Quantum risk analysis*", npj Quantum Information, vol. 5, no. 1, February 2019.

Ref 6: S. Herbert, "The problem with grover-rudolph state preparation for quantum monte-carlo", 2021.

Ref 7: G. Brassard, P. Hoyer, M. Mosca, and A. Tapp, "*Quantum amplitude amplification and estimation*", 2000.

Ref 8: K. Nakaji, "Faster amplitude estimation," 2020.

Ref 9: I. Kerenidis and A. Prakash, "*A method for amplitude estimation with noisy intermediate-scale quantum computers*", U.S. patent application Ser. No. 16/892,229, (year 2020).

Ref 10: L. Grover and T. Rudolph, "Creating superpositions that correspond to efficiently integrable probability distributions", 2002.

Ref 11: A. C. Vazquez and S. Woerner, "Efficient state preparation for quantum amplitude estimation", 2020.

Ref 12: S. Lloyd and C. Weedbrook, "*Quantum generative adversarial learning*", Physical Review Letters, vol. 121, no. 4, July 2018.

Ref 13: C. Zoufal, A. Lucchi, and S. Woerner, "*Quantum generative adversarial networks for learning and loading random distributions*", npj Quantum Information, vol. 5, no. 1, November 2019.

Ref 14: R. Orús, S. Mugel, and E. Lizaso, "*Quantum computing for finance: Overview and prospects*", Review in Physics, vol. 4, pp. 100028, 2019.

Ref 15: D. J. Egger, R. G. Gutiérrez, J. C. Mestre, and S. Woerner, "*Credit risk analysis using quantum computers*", 2019.

Ref 16: S. Chakrabarti, R. Krishnakumar, G. Mazzola, N. Stamatopoulos, S. Woerner, and W. J. Zeng, "*A threshold for quantum advantage in derivative pricing*", 2020
Ref 17: P. Rebentrost and S. Lloyd, "Quantum computational finance: quantum algorithm for portfolio optimization", 2018.

What is claimed is:

1. A quantum computing system configured to compute a value of an arithmetic function using samples from a probability distribution, the quantum computing system comprising:

a classical computer;

a quantum computer comprising one or more qubits and one or more quantum gates configured to act on the one or more qubits, wherein at least a portion of quantum gates comprise rotation gates, and wherein the quantum computer is in communication with the classical computer;

a non-transitory memory configured to store specific computer-executable instructions; and a hardware processor in communication with the non-transitory memory, wherein the hardware processor is configured to execute the specific computer-executable instructions to at least:

receive input data, wherein the input data comprise at least the arithmetic function;

transform the arithmetic function into a series of Fourier components;

generate configuration data, based at least in part on the Fourier components and the input data, by determining a symbolic form of a quantum circuit A and a numerical value of the symbolic form of the quantum circuit A for each Fourier component, wherein the configuration data comprises a number of uses of A for each Fourier component;

determine the number of uses of A based at least in part on a desired value of an error function;

configure the quantum computer based at least in part on the configuration data to prepare one or more quantum circuits representing the Fourier components, wherein the one or more quantum circuits comprise the rotation gates;

execute a quantum algorithm using the one or more quantum circuits to generate outputs comprising quantum measurement results; and generate output data comprising the value of the arithmetic function using the quantum measurement results.

2. The quantum computing system of claim 1, wherein the hardware processor is further configured to execute the specific computer-executable instructions to determine the number of uses of A based at least in part on the input data.

3. The quantum computing system of claim 1, wherein the input data further comprise the probability distribution.

4. The quantum computing system of claim 1, wherein the quantum algorithm comprises a quantum amplitude estimation algorithm.

5. The quantum computing system of claim 1, wherein the input data comprise a stopping criterion or data usable to determine a stopping criterion.

6. The quantum computing system of claim 5, wherein the hardware processor is further configured to execute the specific computer-executable instructions to determine a maximum number of Fourier components based at least in part on the stopping criterion or the data usable to determine a stopping criterion.

7. The quantum computing system of claim 6, wherein a number of Fourier components is equal to or less than the maximum number of Fourier components.

8. The quantum computing system of claim 1, wherein the probability distribution comprises a marginal probability distribution associated with a multidimensional discrete probability distribution.

9. The quantum computing system of claim 8, wherein the arithmetic function is a continuous function that has a continuous first derivative over support of a probability function associated with the probability distribution.

10. The quantum computing system of claim 1, wherein the probability distribution comprises samples from a single dimension of a multivariate probability distribution.

11. The quantum computing system of claim 1, wherein the value of the arithmetic function is an expectation value of the arithmetic function.

12. The quantum computing system of claim 11, wherein the expectation value of the arithmetic function is a mean of the probability distribution.

13. The quantum computing system of claim 1, wherein the hardware processor is a hardware processor of the classical computer.

14. The quantum computing system of claim 1, wherein the classical computer is a classical computer in a remote computing system.

15. The quantum computing system of claim 14, wherein a controller of the quantum computer is configured to receive compiled configuration data generated by the classical computer and to configure the quantum computer based at least in part on the compiled configuration data.

16. The quantum computing system of claim 14, wherein the classical computer is in communication with the quantum computer via a wireless communication link.

17. A quantum computing system configured to compute a value of an arithmetic function using samples from a probability distribution, the quantum computing system comprising:

a classical computer;

a quantum computer comprising one or more qubits and one or more quantum gates configured to act on the one or more qubits, wherein at least a portion of quantum gates comprise rotation gates, and wherein the quantum computer is in communication with the classical computer;

a non-transitory memory configured to store specific computer-executable instructions; and a hardware processor in communication with the non-transitory memory, wherein the hardware processor is configured to execute the specific computer-executable instructions to at least:

receive input data, wherein the input data comprise at least the arithmetic function;

transform the arithmetic function into a series of Fourier components;

generate configuration data, based at least in part on the Fourier components and the input data, by:

determining a symbolic form of a quantum circuit A and a numerical value of the symbolic form of the quantum circuit A for each Fourier component; and determining a symbolic form of a quantum circuit P;

configure the quantum computer based at least in part on the configuration data to prepare one or more quantum circuits representing the Fourier components, wherein the one or more quantum circuits comprise the rotation gates;

execute a quantum algorithm using the one or more quantum circuits to generate outputs comprising quantum measurement results; and generate output data comprising the value of the arithmetic function using the quantum measurement results, wherein the symbolic form of the quantum circuit A is generated based at least in part on the symbolic form of the quantum circuit P.

18. The quantum computing system of claim 17, wherein the hardware processor is further configured to execute the specific computer-executable instructions to configure the quantum computer by further preparing a quantum state |p> associated with the probability distribution using the quantum circuit P.

19. A method for operating a quantum computing system configured to compute a value of an arithmetic function using samples from a probability distribution, the quantum computing system comprising:

a classical computer; and a quantum computer comprising one or more qubits and one or more quantum gates configured to act on the one or more qubits, wherein at least a portion of quantum gates comprise rotation gates, and wherein the quantum computer is in communication with the classical computer;

the method comprising, by a hardware processor of the quantum computing system executing instructions stored on non-transitory memory connected to the hardware processor:

receiving input data, wherein the input data comprise at least the arithmetic function;

transforming the arithmetic function into a series of Fourier components;

generating configuration data, based at least in part on the Fourier components and the input data, by determining a symbolic form of a quantum circuit A and a numerical value of the symbolic form of the quantum circuit A for each Fourier component, wherein the configuration data comprises a number of uses of A for each Fourier component;

determining the number of uses of A based at least in part on a desired value of an error function;

configuring the quantum computer based at least in part on the configuration data to prepare one or more quantum circuits representing the Fourier components, wherein the one or more quantum circuits comprise the rotation gates;

executing a quantum algorithm using the one or more quantum circuits to generate outputs comprising quantum measurement results; and generating output data comprising the value of an arithmetic function using the quantum measurement results.

20. A non-transitory machine-readable data storage medium comprising specific instructions that are executable on data processing hardware, wherein the specific instructions, when executed by the data processing hardware, implement the method of claim 19.

* * * * *